United States Patent
Robinson et al.

(10) Patent No.: US 11,354,239 B2
(45) Date of Patent: Jun. 7, 2022

(54) MAINTAINING DOMAIN COHERENCE STATES INCLUDING DOMAIN STATE NO-OWNED (DSN) IN PROCESSOR-BASED DEVICES

(71) Applicant: Microsoft Technology Licensing, LLC, Redmond, WA (US)

(72) Inventors: Eric Francis Robinson, Raleigh, NC (US); Kevin Neal Magill, Durham, NC (US); Jason Panavich, Raleigh, NC (US); Derek Bachand, Raleigh, NC (US); Michael B. Mitchell, Fuquay-Varina, NC (US); Michael P. Wilson, Fuquay-Varina, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/025,808

(22) Filed: Sep. 18, 2020

(65) Prior Publication Data
US 2022/0091979 A1   Mar. 24, 2022

(51) Int. Cl.
*G06F 12/08* (2016.01)
*G06F 12/0802* (2016.01)

(52) U.S. Cl.
CPC .... *G06F 12/0802* (2013.01); *G06F 2212/621* (2013.01)

(58) Field of Classification Search
CPC ........................ G06F 2212/621; G06F 12/0802
USPC ......................................................... 711/141
See application file for complete search history.

(56) References Cited

U.S. PATENT DOCUMENTS

| 5,617,556 | A | 4/1997 | Baumgartner et al. |
| 8,131,941 | B2 | 3/2012 | Kinter |
| 9,229,868 | B2 | 1/2016 | Blaner et al. |
| 2002/0144185 | A1 | 10/2002 | Farago et al. |

(Continued)

OTHER PUBLICATIONS

Asanovic, et al., "Sequential Consistency and Cache Coherence Protocols", Retrieved from: https://ocw.mit.edu/courses/electrical-engineering-and-computer-science/6-823-computer-system-architecture-fall-2005/lecture-notes/l17_cc.pdf, Nov. 9, 2005, 29 Pages.

(Continued)

*Primary Examiner* — Hua J Song
(74) *Attorney, Agent, or Firm* — Withrow & Terranova, PLLC

(57) ABSTRACT

Maintaining domain coherence states including Domain State No-Owned (DSN) in processor-based devices is disclosed. In this regard, a processor-based device provides multiple processing elements (PEs) organized into multiple domains, each containing one or more PEs and a local ordering point circuit (LOP). The processor-based device supports domain coherence states for coherence granules cached by the PEs within a given domain. The domain coherence states include a DSN domain coherence state, which indicates that a coherence granule is not cached within a shared modified state within any domain. In some embodiments, upon receiving a request for a read access to a coherence granule, a system ordering point circuit (SOP) determines that the coherence granule is cached in the DSN domain coherence state within a domain of the plurality of domains, and can safely read the coherence granule from the system memory to satisfy the read access if necessary.

30 Claims, 22 Drawing Sheets

(56) References Cited

U.S. PATENT DOCUMENTS

| | | |
|---|---|---|
| 2007/0150663 A1 | 6/2007 | Mendelson et al. |
| 2008/0086602 A1 | 4/2008 | Guthrie et al. |
| 2011/0153946 A1 | 6/2011 | Solihin |
| 2017/0003905 A1 | 1/2017 | Mukherjee et al. |
| 2017/0091092 A1 | 3/2017 | Hur et al. |
| 2017/0228316 A1* | 8/2017 | Steinmacher-Burow ............... G06F 12/0817 |
| 2018/0067542 A1 | 3/2018 | Avoinne et al. |
| 2019/0018815 A1* | 1/2019 | Fleming ............... G06F 13/423 |
| 2019/0087333 A1 | 3/2019 | Robinson et al. |
| 2019/0108125 A1 | 4/2019 | Bartik et al. |
| 2019/0220410 A1 | 7/2019 | Retter et al. |
| 2021/0064529 A1* | 3/2021 | Dasti ............... G06F 12/121 |

OTHER PUBLICATIONS

"International Search Report and Written Opinion Issued in PCT Application No. PCT/US21/035061", dated Oct. 5, 2021, 11 Pages.

\* cited by examiner

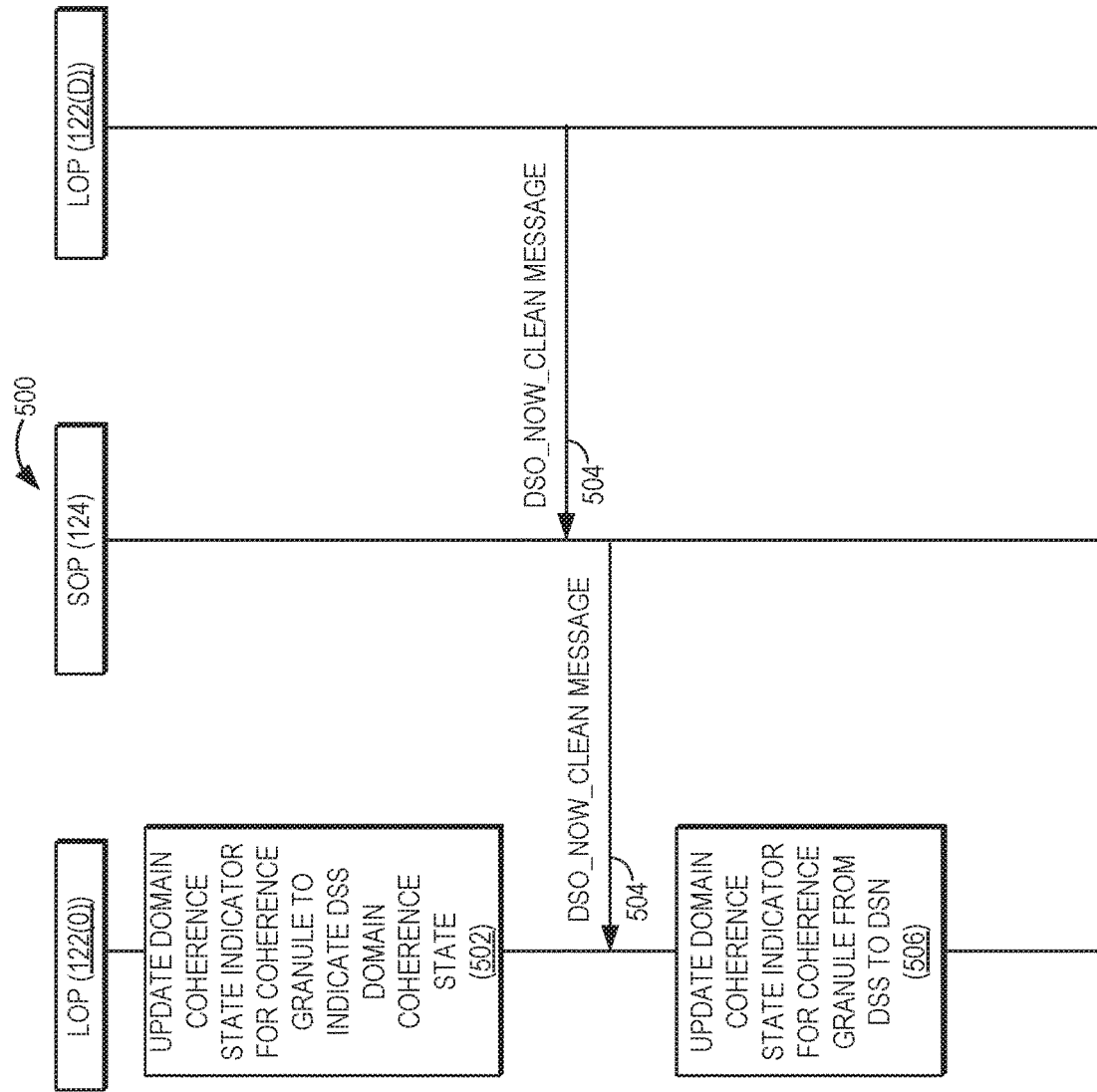

MAINTAINING DOMAIN COHERENCE STATES INCLUDING DOMAIN STATE NO-OWNED (DSN) IN PROCESSOR-BASED DEVICES

FIELD OF THE DISCLOSURE

The technology of the disclosure relates to cache coherence protocols in processor-based devices, and, more particularly, to maintaining domain coherence states.

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and the local caches of the PEs. Thus, to ensure that all of the PEs have a consistent view of the shared data, the processor-based device provides mechanisms for maintaining cache coherence. This allows conflicts that may arise between the PEs due to inconsistencies between local copies of the shared data to be avoided.

One such mechanism for guaranteeing that PEs within a processor-based device observe a consistent view of shared data is a system ordering point circuit (SOP). In processor-based devices that employ an SOP, a PE seeking a copy of a coherence granule (i.e., the smallest memory block for which coherence is maintained, typically corresponding to a cache line) from the system memory sends a read request for the coherence granule to the SOP. The SOP then sends a snoop to other PEs within the processor-based device to determine whether any of the other PEs is in possession of a coherent copy of that coherence granule. A PE having a coherent copy of the coherence granule replies with a snoop response and provides its copy of the coherence granule to the requesting PE to satisfy the read request. The performance of processor-based devices using SOPs may be further improved by subdividing the PEs of the processor-based device into multiple domains, with each domain having a local ordering point circuit (LOP) to which PEs within the domain send memory access requests. Using LOPs in conjunction with an SOP may enable requests to be satisfied more quickly, for example, in cases in which the requesting PE and the PE holding a coherent copy of the requested coherence granule are within the same domain.

However, circumstances may arise in which a snoop is sent as a result of a first PE seeking a copy of a coherence granule, but a second PE holding a coherent copy of the coherence granule is unable to service the snoop in a timely fashion (e.g., because the snoop-handling resources of the second PE or its domain's LOP are busy due to prior operations). The SOP cannot simply read the requested coherence granule from the system memory on behalf of the first PE, because the SOP is unable to determine whether or not the coherence granule in the system memory is stale (i.e., whether or not a cached copy of the coherence granule held by a PE has been modified but not written back to the system memory). Consequently, either the SOP 124 must continually resend the snoop until the second PE 104(0) services the snoop, or else the second PE 104(0) may cause a snoop channel to stall until the second PE 104(0) can service the snoop. Both of these approaches may result in unacceptably long wait times to access the coherence granule, and may degrade the overall system performance of the processor-based device.

Accordingly, a mechanism for reducing the need to communicate with unresponsive domains is desirable.

SUMMARY

Exemplary embodiments disclosed herein include maintaining domain coherence states including Domain State No-Owned (DSN) in processor-based devices. In this regard, in one exemplary embodiment, a processor-based device provides multiple processing elements (PEs) that are organized into multiple domains, with each domain containing one or more PEs. Each domain includes a local ordering point circuit (LOP) that is communicatively coupled to the PEs within the domain, and is also communicatively coupled to a system ordering point circuit (SOP) of the processor-based device. The processor-based device is configured to support domain coherence states, which are a superset of conventional cache coherence states that indicate a domain-level coherence state of each coherence granule cached by the PEs within a given domain. The domain coherence states supported by the processor-based device include a DSN domain coherence state, which indicates that a coherence granule is not cached with an Owned (O) cache coherence state within any domain (i.e., the coherence granule is not cached in a shared modified state). In some embodiments, if a system ordering point circuit (SOP) of the processor-based device subsequently receives a request for a read access to a coherence granule and determines that the coherence granule is cached in the DSN domain coherence state within a domain of the plurality of domains, the SOP can safely read the coherence granule from the system memory to satisfy the read access if necessary (e.g., if a snoop response is not received from an LOP in a timely fashion). In this manner, the read request can be satisfied more quickly because the SOP does not have to wait for snoop responses from unresponsive LOPs, and the SOP can be assured that a coherence granule held in the DSN domain coherence state is not stale in the system memory.

In another exemplary embodiment, a processor-based device is provided. The processor-based device includes a plurality of PEs and a plurality of domains. Each domain includes one or more PEs of the plurality of PEs, and an LOP communicatively coupled to the one or more PEs. A first LOP of a first domain of the plurality of domains is configured to determine that a coherence granule, cached within a local cache of a first PE of the one or more PEs of the first domain as a first cached copy, is not cached with an O cache coherence state within any domain of the plurality of domains. The first LOP is further configured to update a domain coherence state indicator for the coherence granule to indicate that the coherence granule is cached in a DSN domain coherence state.

In another exemplary embodiment, a method is provided. The method includes determining, by an LOP of a processor-based device, the LOP being within a first domain of a plurality of domains each comprising one or more PEs of a plurality of PEs, that a coherence granule, cached within a local cache of a first PE of the one or more PEs of the first domain as a first cached copy, is not cached with an O cache coherence state within any domain of the plurality of domains. The method further includes updating a domain coherence state indicator for the coherence granule to indicate that the coherence granule is cached in a DSN domain coherence state within the first domain.

In another exemplary embodiment, a non-transitory computer-readable medium having stored thereon computer-executable instructions is provided. The computer-executable instructions, when executed by a processor device, cause the processor device to determine that a coherence granule, cached within a local cache of a first PE of one or more PEs of a first domain of a plurality of domains as a first cached copy, is not cached with an O cache coherence state within any domain of the plurality of domains. The computer-executable instructions further cause the processor device to update a domain coherence state indicator for the coherence granule to indicate that the coherence granule is cached in a DSN domain coherence state within the first domain.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

FIG. 5 is a message flow diagram illustrating exemplary communications flows among and operations performed by elements of FIG. 1 for transitioning from the DSS domain coherence state to the DSN domain coherence state based on receiving a DSO_NOW_CLEAN message, according to some embodiments;

Figure 1:
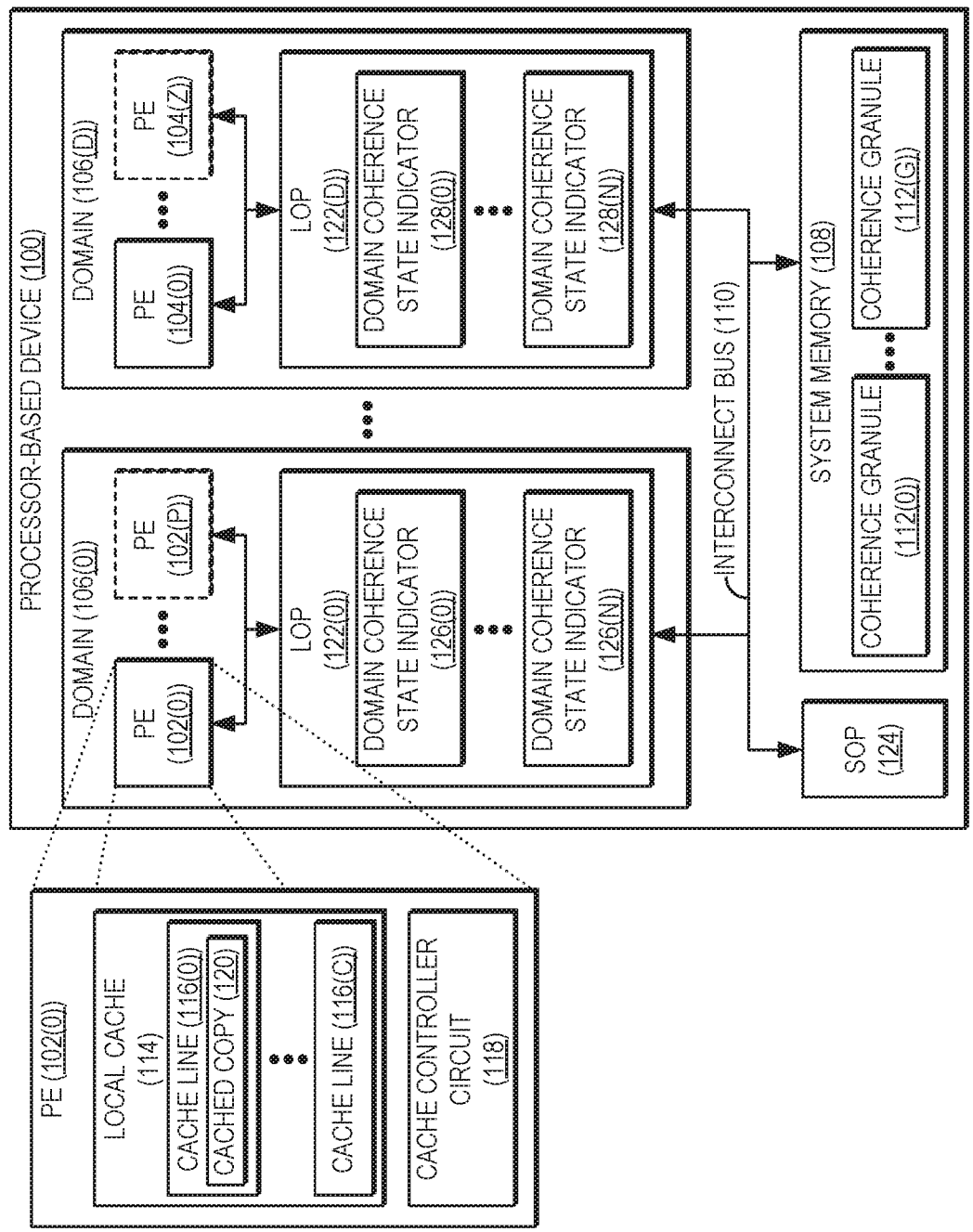
FIG. 1 is a block diagram illustrating an exemplary processor-based device configured to maintain domain coherence states, including a Domain State No-Owned (DSN) domain coherence state, in processor-based devices, according to some embodiments.
Figure 15:
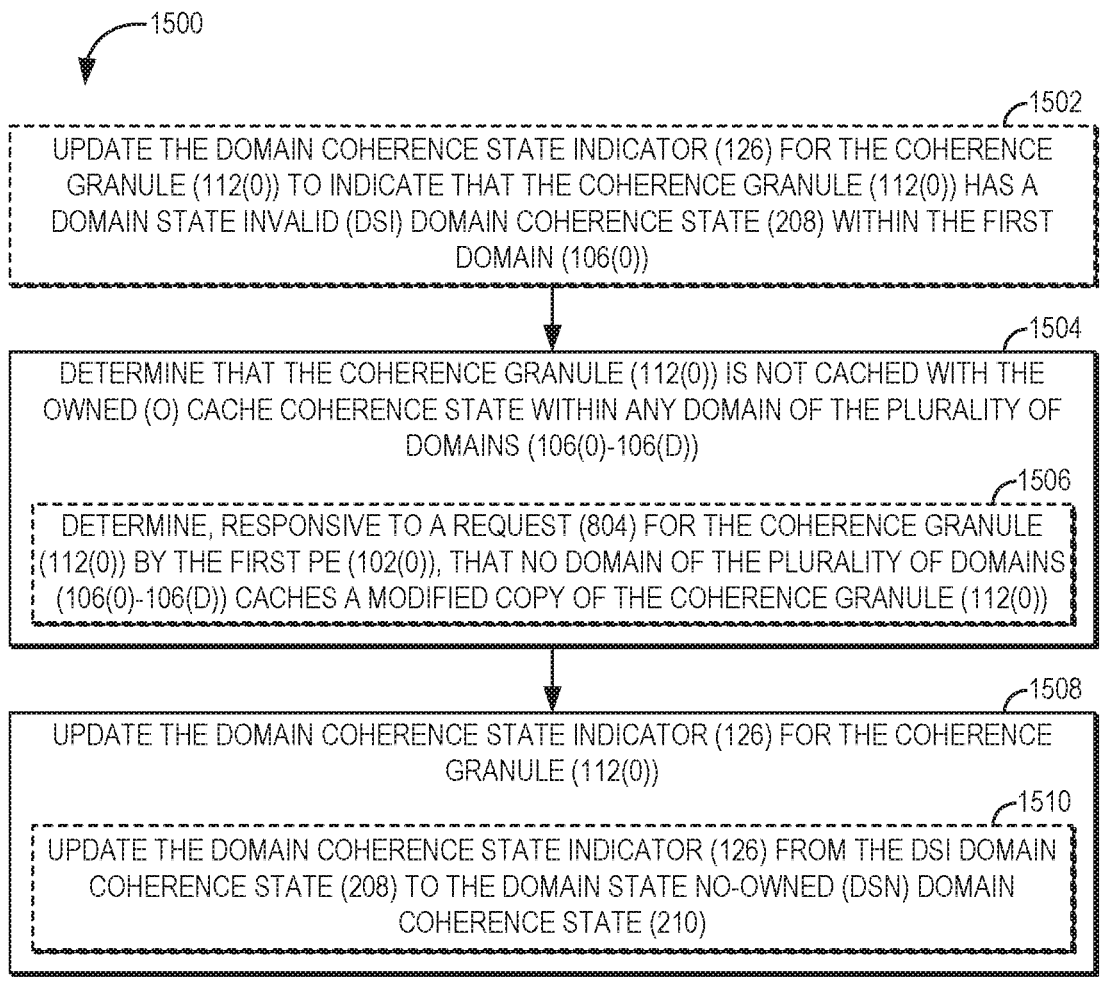
Figure 16:
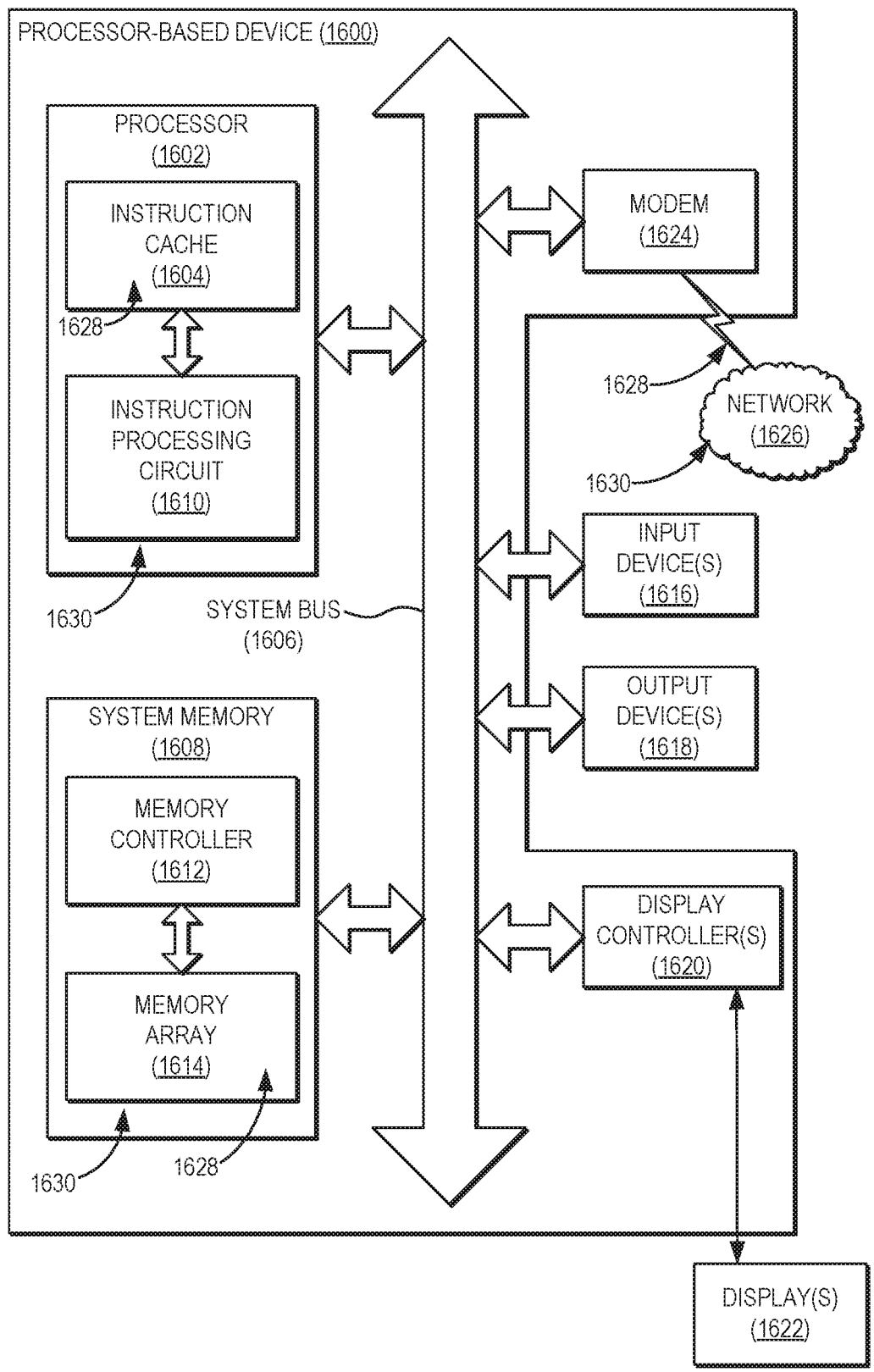

FIG. 15 is a flowchart illustrating exemplary operations for transitioning from a DSI domain coherence state to the DSN domain coherence state, according to some embodiments; and FIG. 16 is a block diagram of an exemplary processor-based device, such as the processor-based device of FIG. 1, that is configured to maintain domain coherence states, including the DSN domain coherence state, according to some embodiments.

DETAILED DESCRIPTION

Exemplary embodiments disclosed herein include maintaining domain coherence states including Domain State No-Owned (DSN) in processor-based devices. In this regard, in one exemplary embodiment, a processor-based device provides multiple processing elements (PEs) that are organized into multiple domains, with each domain containing one or more PEs. Each domain includes a local ordering point circuit (LOP) that is communicatively coupled to the PEs within the domain, and is also communicatively coupled to a system ordering point circuit (SOP) of the processor-based device. The processor-based device is configured to support domain coherence states, which are a superset of conventional cache coherence states that indicate a domain-level coherence state of each coherence granule cached by the PEs within a given domain. The domain coherence states supported by the processor-based device include a DSN domain coherence state, which indicates that a coherence granule is not cached with an Owned (O) cache coherence state within any domain (i.e., the coherence granule is not cached in a shared modified state). If the SOP receives a request for a read access to a coherence granule and determines that the coherence granule is cached in the DSN domain coherence state within a domain of the plurality of domains, the SOP can safely read the coherence granule from the system memory to satisfy the read access if necessary (e.g., if a snoop response is not received from an LOP in a timely fashion). In this manner, the read request can be satisfied more quickly because the SOP does not have to wait for snoop responses from unresponsive LOPs, and the SOP can be assured that a coherence granule held in the DSN domain coherence state is not stale in the system memory.

In this regard, FIG. 1 illustrates an exemplary processor-based device 100 that provides a plurality of processing elements (PEs) 102(0)-102(P), 104(0)-104(Z) for processing executable instructions. Each of the PEs 102(0)-102(P), 104(0)-104(Z) may comprise. e.g., an individual processor core comprising a logical execution unit and associated caches and functional units. The PEs 102(0)-102(P). 104 (0)-104(Z) are organized into a plurality of domains 106(0)-106(D), with each domain of the plurality of domains 106(0)-106(D) containing one or more PEs of the plurality of PEs 102(0)-102(P), 104(0)-104(Z). Thus, in the example of FIG. 1, the domain 106(0) includes the PEs 102(0)-102 (P), while the domain 106(D) includes the PEs 104(0)-104 (Z).

The PEs 102(0)-102(P), 104(0)-104(Z) of the processor-based device 100 of FIG. 1 are interconnected to each other and to a system memory 108 by an interconnect bus 110. As seen in FIG. 1, the system memory 108 is subdivided into multiple coherence granules 112(0)-112(G), each representing the smallest unit of memory (e.g., 64 bytes, as a non-limiting example) for which cache coherence is maintained by the processor-based device 100. In the example of FIG. 1, the PE 102(0) includes a local cache 114 comprising cache lines 116(0)-116(C), along with a cache controller circuit 118 embodying logic for controlling access to the local cache 114. It is to be understood that the PE 102(0) may include other caches in addition to the local cache 114 illustrated in FIG. 1. The local cache 114 is used by the PE 102(0) to locally store data loaded from the system memory 108 for quicker access. For example, as seen in FIG. 1, the cache line 116(0) of the local cache 114 stores a cached copy 120 of one of the coherence granules 112(0)-112(G) (e.g., the coherence granule 112(0), as a non-limiting example). It is to be understood that, although not illustrated in FIG. 1, each of the PEs 102(0)-102(P). 104(0)-104(Z) includes a local cache and a cache controller circuit corresponding in functionality to the local cache 114 and the cache controller circuit 118 of the PE 102(0).

Each domain 106(0)-106(D) of the processor-based device 100 includes a corresponding local ordering point circuit (LOP) 122(0)-122(D) that is configured to arbitrate among cache coherence bus commands received from the PEs 102(0)-102(P), 104(0)-104(Z) within the domains 106 (0)-106(D). The processor-based device 100 further includes a system ordering point circuit (SOP) 124 that is configured to communicate with the LOPs 122(0)-122(D) to arbitrate among cache coherence bus commands received from master PEs among the PEs 102(0)-102(P), 104(0)-104(Z), direct snoops to and receive snoop responses from snooper PEs among the PEs 102(0)-102(P), 104(0)-104(Z), and send response messages to both master PEs and snooper PEs among the PEs 102(0)-102(P), 104(0)-104(Z). The SOP 124 may work in conjunction with a snoop filter (not shown) that is configured to monitor traffic on the interconnect bus 110 to track coherence states of cache lines such as the cache lines 116(0)-116(C).

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, each of the PEs 102(0)-102(P) may further include one or more functional units, instruction caches, unified caches, memory controllers, interconnect buses, and/or additional memory devices, caches, and/or controller circuits, which are omitted from FIG. 1 for the sake of clarity.

As noted above, circumstances may arise in which a snoop is sent as a result of a first PE (e.g., the PE 102(0), as a non-limiting example) seeking a copy of a coherence granule (such as the coherence granule 112(0)), but a second PE (e.g., the PE 104(0), as a non-limiting example) holding a coherent copy of the coherence granule 112(0) is unable to service the snoop in a timely fashion. In such circumstances, the SOP 124 cannot simply read the requested coherence granule 112(0) from the system memory 108 on behalf of the first PE 102(0), because the SOP 124 is unable to determine whether or not the coherence granule 112(0) in the system memory 108 is stale (i.e., a cached copy of the coherence granule 112(0) has been modified by another of the PEs 102(0)-102(P), 104(0)-104(Z)). Consequently, either the SOP 124 must continually resend the snoop until the second PE 104(0) services the snoop, or else the second PE 104(0) may cause a snoop channel to stall until the second PE 104(0) can service the snoop. Both of these approaches may result in unacceptably long wait times to access the coherence granule 112(0), and may degrade the overall system performance of the processor-based device 100.

In this regard, the LOPs 122(0)-122(D) of the processor-based device 100 are configured to provide domain coherence state indicators 126(0)-126(N), 128(0)-128(N) to indicate domain coherence states for coherence granules cached within the respective domains 106(0)-106(D). The domain coherence state indicators 126(0)-126(N). 128(0)-128(N) may be stored or embodied as part of a snoop filter (not shown), a directory (not shown), or any other appropriate data structure or circuit within the LOPs 122(0)-122(D). As discussed in greater detail below with respect to FIG. 2, the domain coherence states are a superset of conventional cache coherence states, and indicate a coherence state of a coherence granule at the domain level. In particular, the LOPs 122(0)-122(D) are configured to support a DSN domain coherence state, which indicates that a corresponding coherence granule is not cached with an O cache coherence state (i.e., in a shared modified state) within any of the domains 106(0)-106(D).

Upon determining that a coherence granule (e.g., the coherence granule 112(0), as a non-limiting example) is not cached with an O cache coherence state within any of the domains 106(0)-106(D), an LOP such as the LOP 122(0) updates a domain coherence state indicator (e.g., the domain coherence state indicator 126(0), as a non-limiting example) to indicate that the coherence granule 112(0) is cached in the DSN domain coherence state within the domain 106(0). Subsequently, if the SOP 124 receives a request for a read access to the coherence granule 112(0), the SOP 124 can determine (e.g., by receiving the domain coherence state indicator 126(0) from the LOP 122(0)) that the coherence granule 112(0) is known by the domain 106(0) to have the DSN coherence state. The SOP 124 can then read the coherence granule from the system memory 108 to satisfy the read request (i.e., instead of having to wait for snoop responses from unresponsive domains among the domains 106(0)-106(D)).

Figure 2:
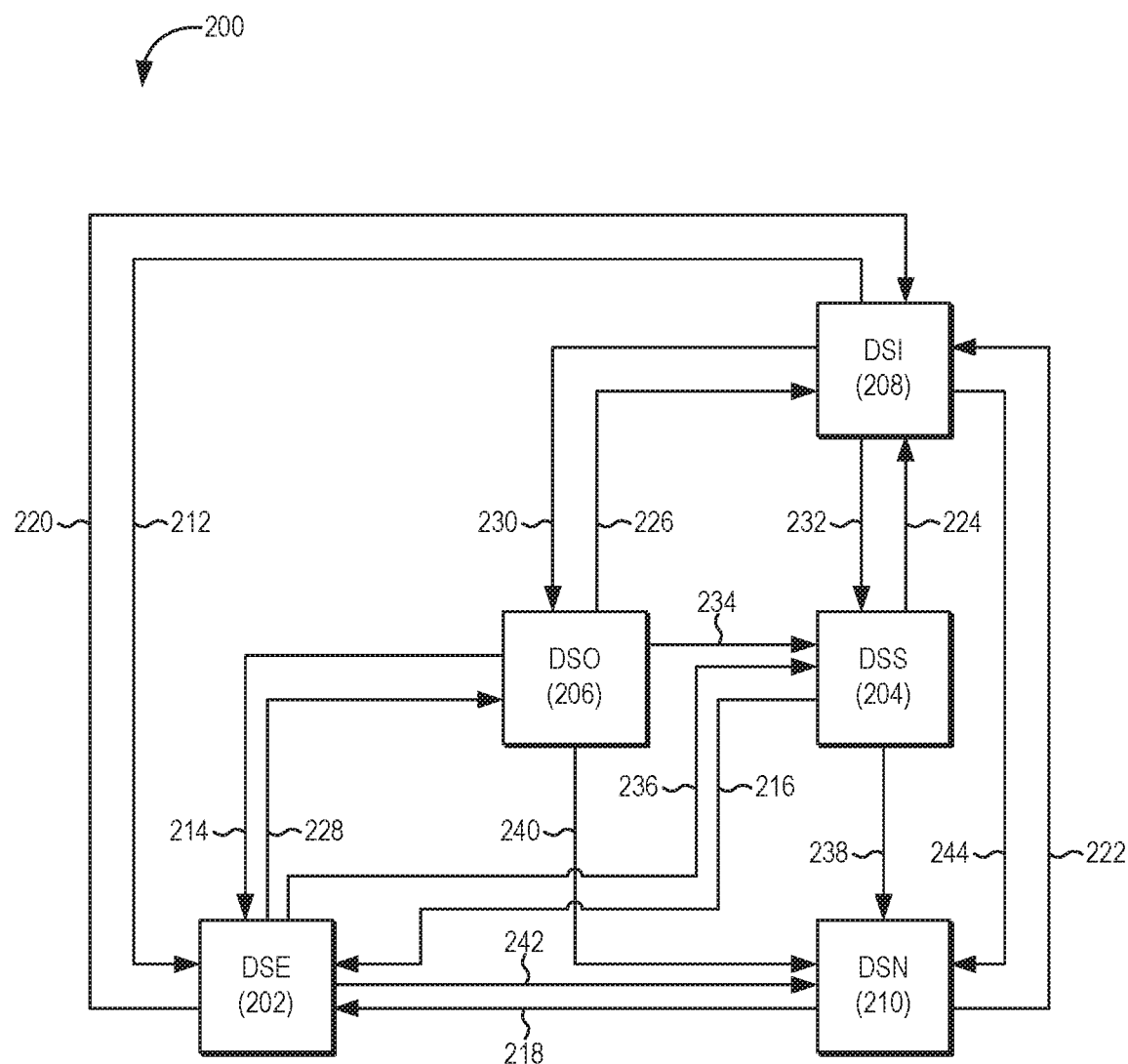
FIG. 2 is a coherence state transition diagram illustrating domain coherence states and transitions between the domain coherence states, according to some embodiments.

To illustrate exemplary domain coherence states and transitions between the domain coherence states according to some embodiments. FIG. 2 provides a coherence state transition diagram 200. As noted above, the domain coherence states are a superset of conventional cache coherence states, and include a Domain State Exclusive (DSE) domain coherence state 202, a Domain State Shared (DSS) domain coherence state 204, a Domain State Owned (DSO) domain coherence state 206, a Domain State Invalid (DSI) domain coherence state 208, and a Domain State No-Owned (DSN) domain coherence state 210. A description of each domain coherence state is provided below in Table 1.

TABLE 1

| Domain state | Reference Number | Meaning |
| --- | --- | --- |
| Domain State Exclusive (DSE) | 202 | This domain has exclusive access to the corresponding coherence granule, and PEs within the domain may write and read the coherence granule.<br>One PE within the domain might hold the coherence granule in an exclusive cache coherence state (e.g., an exclusive clean (E) or an exclusive modified (M) cache coherence state), or some number of PEs within the domain might hold the coherence granule in a shared (S) cache coherence state.<br>No other domain holds a copy of the coherence granule. |
| Domain State Shared (DSS) | 204 | This domain has shared access to the corresponding coherence granule, and PEs within the domain may read but not write the coherence granule.<br>No PE within the domain may hold the coherence granule in the E or M cache coherence states. Some number of PEs within the domain might hold the coherence granule in the S cache coherence state.<br>Another domain might hold a copy of the coherence granule in the DSS, DSN, or DSO domain coherence states. |
| Domain State Owned (DSO) | 206 | This domain has shared access to the coherence granule, and PEs within the domain may read but not write the coherence granule. This domain is responsible for updating memory when it evicts the coherence granule.<br>No PE within the domain may hold the coherence granule in the E or M cache coherence states. One PE within the domain holds the coherence granule in the O cache coherence state, while some number of PEs within the domain might hold the coherence granule in the S cache coherence state.<br>Another domain might hold a copy of the coherence granule in the DSS domain coherence state. |
| Domain State Invalid (DSI) | 208 | This domain does not hold a coherent copy of the coherence granule.<br>No PE within the domain may hold a valid copy of the coherence granule.<br>Another domain might hold a copy of the coherence granule in the DSS, DSO, DSN, or DSE domain coherence states. |
| Domain State No-Owned (DSN) | 210 | No domain holds a copy of the coherence granule in an owned (O) cache coherence state.<br>Another domain might be in the DSS, DSL or DSN domain coherence states with respect to the coherence granule. |

Transitions between different domain coherence states is described in further detail below in Table 2:

TABLE 2

| Reference Number | Old State | New State | Example Reasons for Transition |
| --- | --- | --- | --- |
| 212 | DSI | DSE | A PE within a domain requests to receive (i.e., read) a copy of the coherence granule, and is given the coherence granule in the E cache coherence state. |
| 214 | DSO | DSE | A PE within the domain holds a copy of the coherence granule in the O cache coherence state (i.e., in a shared modified state), and requests that its coherence state be promoted to an exclusive cache coherence state (e.g., the M cache coherence state) so that the PE may write to the coherence granule. |
| 216 | DSS | DSE | A PE within the domain holds a copy of the coherence granule in the S cache coherence state, and requests that its coherence state be promoted to the E cache coherence state so that the PE may write to the coherence granule. |
| 218 | DSN | DSE | A PE within the domain holds a copy of the coherence granule in the S cache coherence state, and requests that its coherence state be promoted to the E cache coherence state so that it may write to the coherence granule. |
| 220 | DSE | DSI | A PE within the domain holds a copy of the coherence granule in the modified (M) or exclusive (E) cache coherence states, and writes the coherence granule back to memory.<br>The last PE within the domain that holds a copy of the coherence granule evicts the coherence granule. |

TABLE 2-continued

| Reference Number | Old State | New State | Example Reasons for Transition |
|---|---|---|---|
| 222 | DSN | DSI | The last PE within the domain that holds a copy of the coherence granule evicts the coherence granule. |
| 224 | DSS | DSI | The last PE within the domain that holds a copy of the coherence granule evicts the coherence granule. |
| 226 | DSO | DSI | The last PE within the domain that holds a copy of the coherence granule evicts the coherence granule. If that PE holds the copy of the coherence granule in the O cache coherence state, the eviction is a writeback to memory. |
| 228 | DSE | DSO | A PE within the domain holds a copy of the coherence granule in the M cache coherence state, and, in response to a snoop, provides a shared copy to another domain and retains responsibility to update memory. This causes the PE to downgrade its coherence state from the M cache coherence state to the O cache coherence state. |
| 230 | DSI | DSO | A PE within the domain requests to receive a copy of a coherence granule that is held in the M cache coherence state or the O cache coherence state by another domain. When that domain provides a shared copy of the coherence granule, it passes responsibility to update memory to the requesting PE. |
| 232 | DSI | DSS | A PE within the domain requests to receive a copy of a coherence granule that is held in the M cache coherence state. or the O cache coherence state by another domain. When that domain provides a shared copy of the coherence granule, it retains responsibility to update memory. |
| 234 | DSO | DSS | A PE within the domain holds a copy of the coherence granule in the O cache coherence state, and, in response to a snoop, provides a shared copy to another domain and passes responsibility to update memory to the requestor. This causes the PE to downgrade its coherence state from the O cache coherence state to the S cache coherence state. Because the other domain goes to the DSO domain coherence state, this domain goes to the DSS cache coherence state.. |
| 236 | DSE | DSS | A PE within the domain holds a modified copy of the coherence granule in the M cache coherence state or the O cache coherence state. In response to a snoop, the PE provides a shared copy to another domain and passes responsibility to update memory to the requestor. This causes the PE to downgrade its coherence state from the M or O cache coherence states to the S cache coherence state. Because the other domain goes to the DSO domain coherence state, this domain goes to the DSS domain coherence state. |
| 238 | DSS | DSN | A PE within the domain holds a copy of the coherence granule in the S cache coherence state, and snoops a read of the coherence granule. When the PE observes the snoop responses of the other domains, the PE sees that none has reported that its state is the DSO domain coherence state. This lets the domain update its state from the DSS domain coherence state to the DSN domain coherence state. Alternatively, if any snooping domain reports the DSN domain coherence state, then any domain that is in the DSS domain coherence state may update its domain coherence state from DSS to DSN. Alternatively, a snooping domain that holds a coherence granule in the DSS domain coherence state may receive a DSO_NOW_CLEAN message informing it that a domain holding the coherence granule in the DSO domain coherence state domain has cleaned its copy and has gone to the DSN domain coherence state. |
| 240 | DSO | DSN | A PE within the domain holds a copy of the coherence granule in the O cache coherence state and either cleans its copy to memory or writes it back, and another PE holds a copy of the coherence granule in the S cache coherence state. |
| 242 | DSE | DSN | A PE within the domain holds a copy of the coherence granule in the E cache coherence state, and, in response to a snoop, provides a shared copy to another domain. Because the domain knows that the coherence granule is not modified, the domain updates its domain coherence state from DSE to DSN. |

TABLE 2-continued

| Reference Number | Old State | New State | Example Reasons for Transition |
|---|---|---|---|
| 244 | DSI | DSN | A PE within the domain requests to receive a copy of the coherence granule, is given the coherence granule in the S cache coherence state, and is informed that no PE holds a modified copy of the coherence granule. Because the domain knows that the system memory is not stale, the domain updates its domain coherence state from DSI to DSN. |

Figure 6:
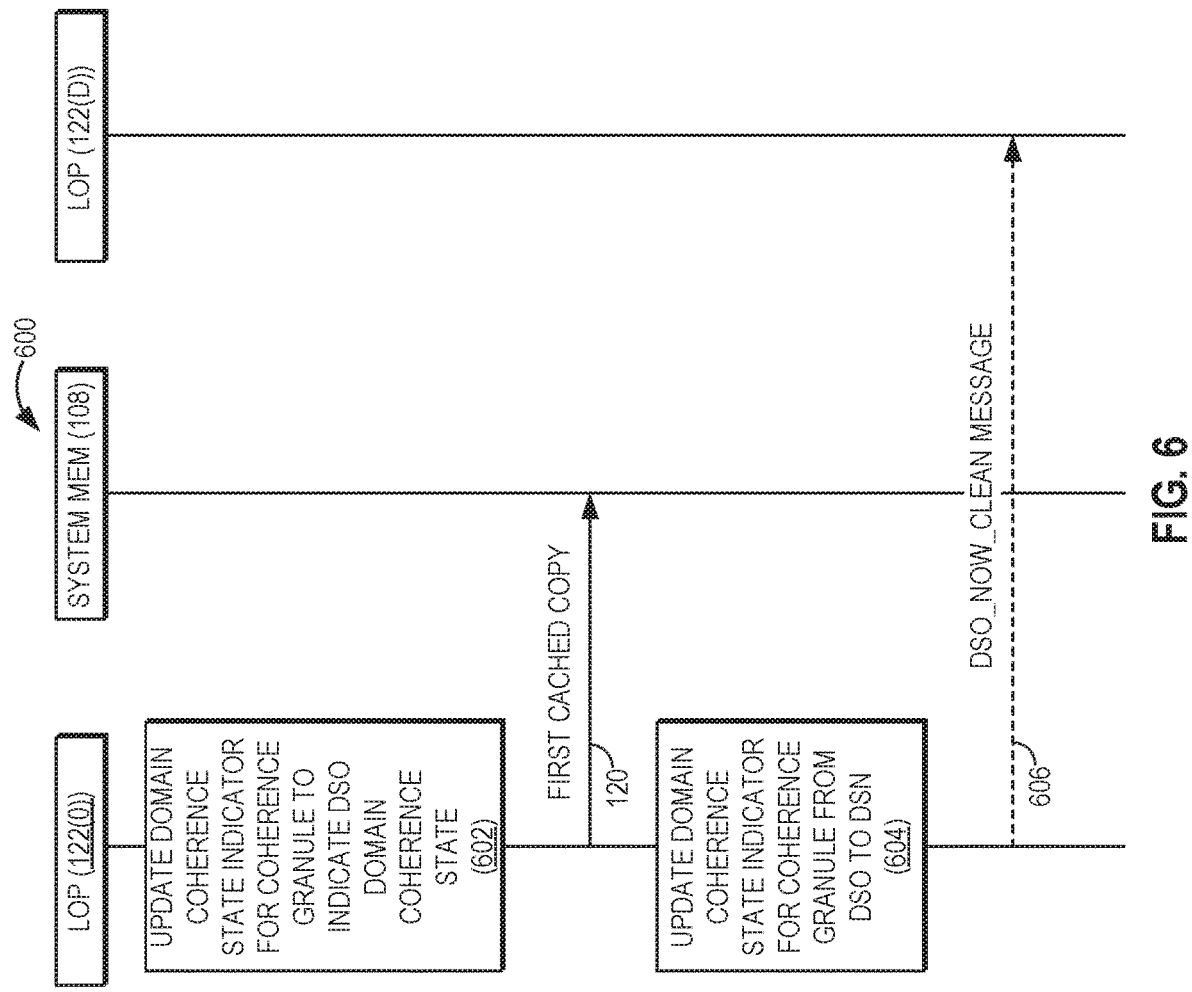
FIG. 6 is a message flow diagram illustrating exemplary communications flows among and operations performed by elements of FIG. 1 for transitioning from a Domain State Owned (DSO) domain coherence state to the DSN domain coherence state, according to some embodiments.
Figure 7:
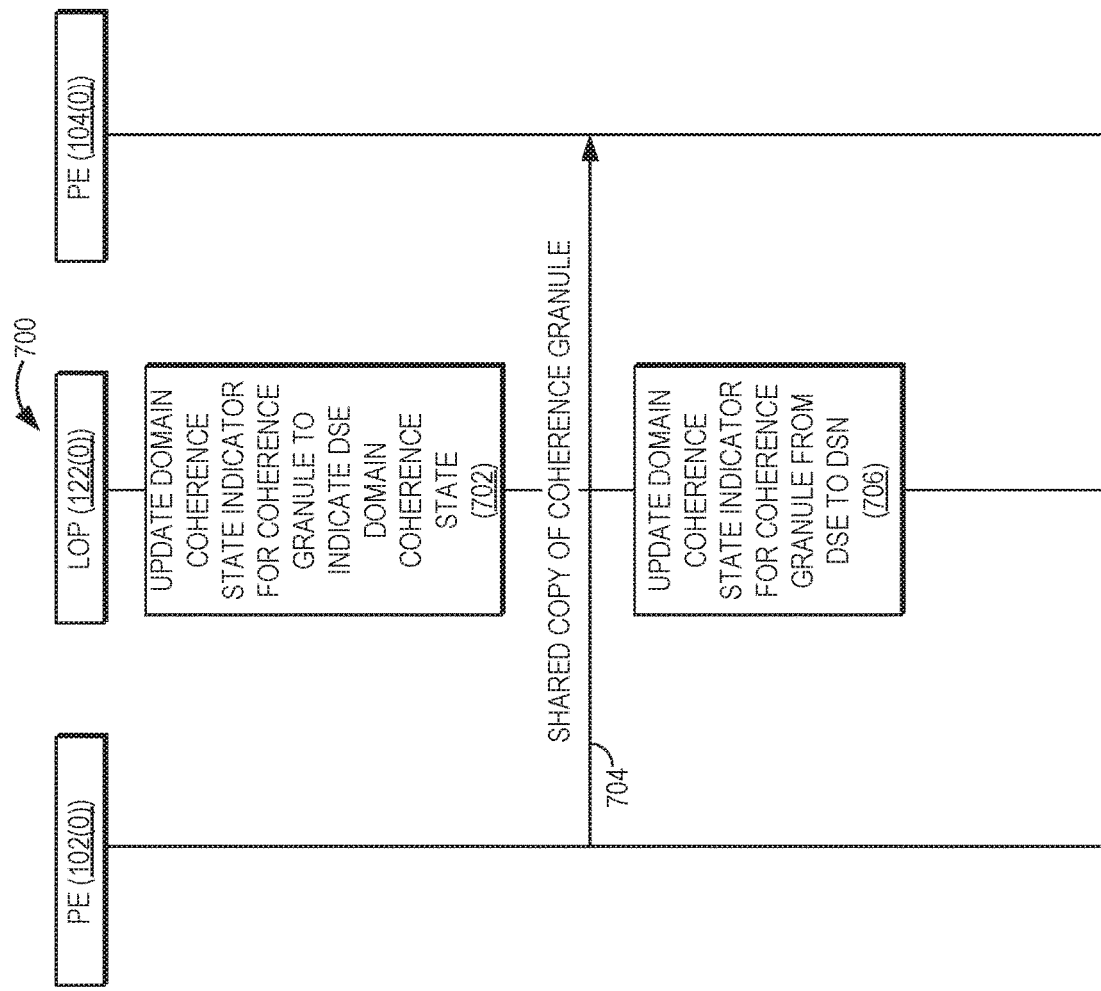
FIG. 7 is a message flow diagram illustrating exemplary communications flows among and operations performed by elements of FIG. 1 for transitioning from a Domain State Exclusive (DSE) domain coherence state to the DSN domain coherence state, according to some embodiments.
Figure 8:
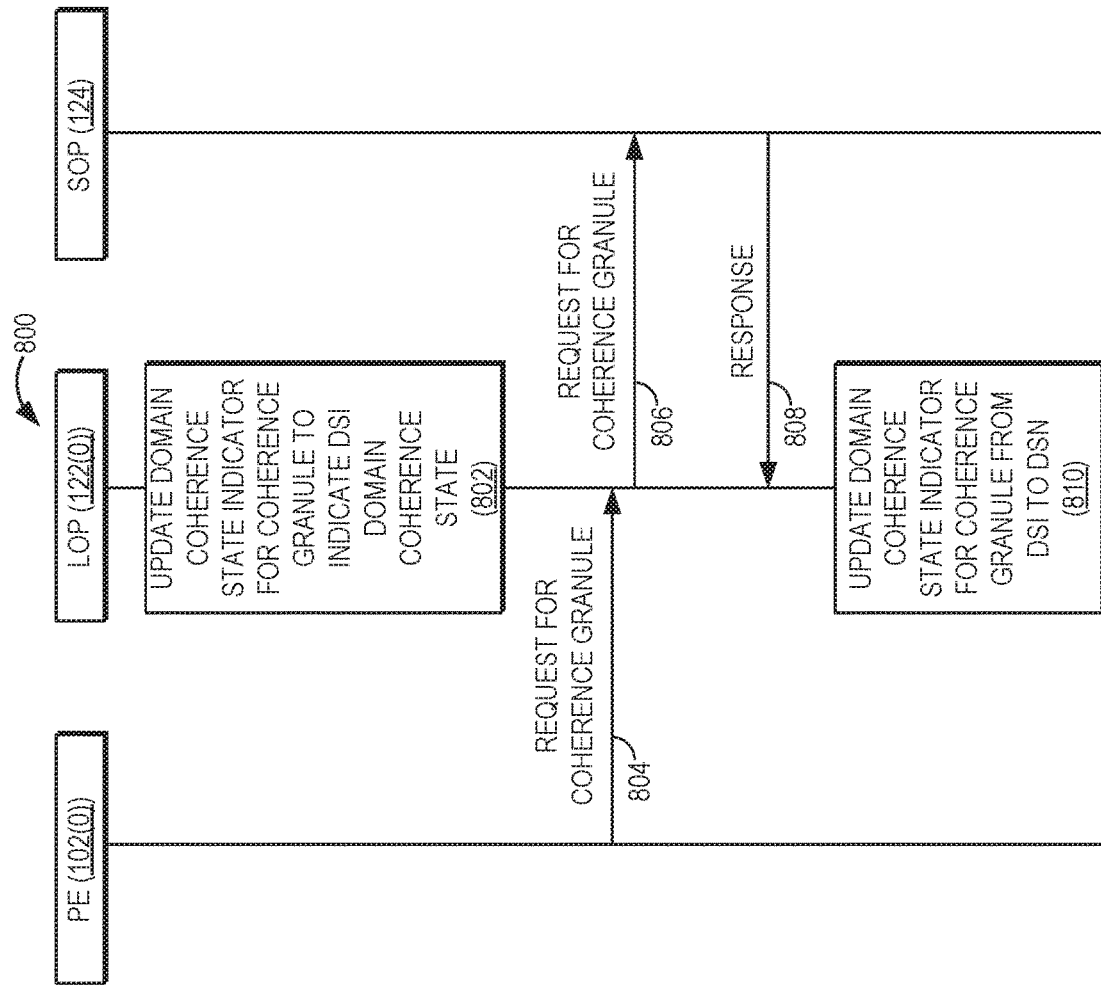
FIG. 8 is a message flow diagram illustrating exemplary communications flows among and operations performed by elements of FIG. 1 for transitioning from a Domain State Invalid (DSI) domain coherence state to the DSN domain coherence state, according to some embodiments.

FIGS. 3A-31D, 4A-4C, and 5-8 provide message flow diagrams to illustrate communications flows and operations for transitioning to and from the DSN domain coherence state 210 according to some embodiments. FIGS. 3A-3D) illustrate exemplary communications flows and operations performed by elements of FIG. 1 for determining and updating the domain coherence state of a coherence granule such as the coherence granule 112(0) of FIG. 1, and for transitioning from the DSN domain coherence state 210 to the DSE domain coherence state 202 or the DSI domain coherence state 208. FIGS. 4A-4C and 5 illustrate exemplary communications flows and operations for transitioning from the DSS domain coherence state 204 to the DSN domain coherence state 210, while FIGS. 6-8 illustrate exemplary communications flows and operations for transitioning from the DSO domain coherence state 206, the DSE domain coherence state 202, and the DSI domain coherence state 208, respectively, to the DSN domain coherence state 210.

Turning first to FIGS. 3A-3D, a message flow diagram 300 illustrates exemplary communications flows among and operations performed by elements of FIG. 1 for maintaining domain coherence states including the DSN domain coherence state 210, according to some embodiments. For the sake of clarity, elements of FIGS. 1 and 2 are referenced in describing FIGS. 3A-3D. As seen in FIGS. 3A-3D, the message flow diagram 300 shows the PE 102(0), the LOP 122(0), the SOP 124, the LOP 122(D), the PE 104(0), and the system memory 108 ("SYSTEM MEM") represented by vertical lines, with communications between these elements illustrated by captioned arrows and operations performed by these elements represented by captioned blocks. It is to be understood that not all of the operations illustrated in FIGS. 3A-3D may be performed by all embodiments, and/or that some operations illustrated in FIGS. 3A-3D may be performed in an order other than illustrated herein.

Figure 3A:
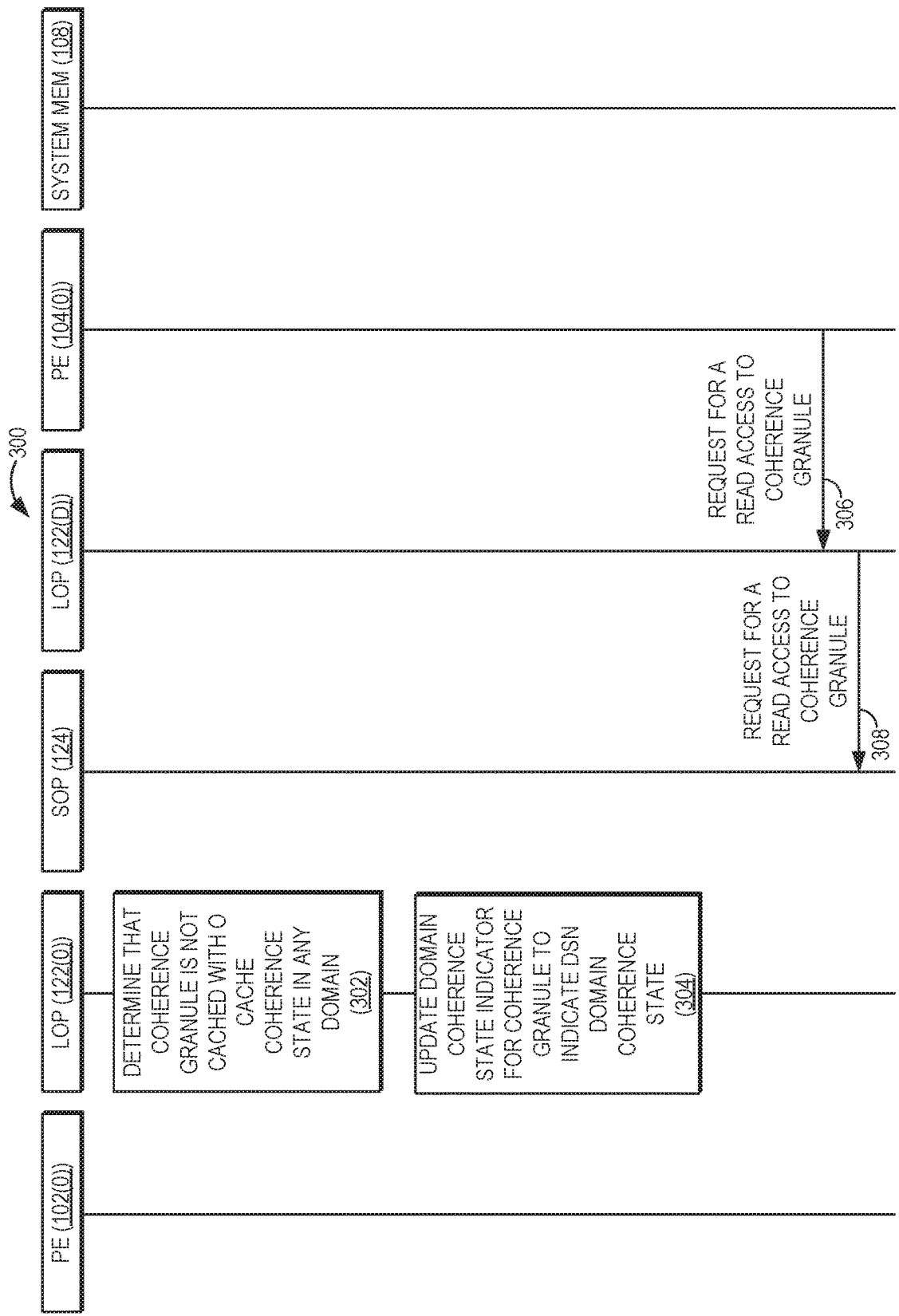
FIGS. 3A-3D are message flow diagrams illustrating exemplary communications flows among and operations performed by elements of FIG. 1 for maintaining domain coherence states including the DSN domain coherence state, according to some embodiments.

In FIG. 3A, operations begin with the LOP 122(0) determining that the coherence granule 112(0), cached within the local cache 114 of the PE 102(0) of the one or more PEs 102(0)-102(P) of the domain 106(0) as the cached copy 120, is not cached with the O cache coherence state within any domain of the plurality of domains 106(0)-106(D) (block 302). The LOP 122(0) updates a domain coherence state indicator, such as the domain coherence state indicator 126(0), for the coherence granule 112(0) to indicate that the coherence granule 112(0) is cached in the DSN domain coherence state 210 within the domain 106(0) (block 304). Subsequently, the PE 104(0) sends a request 306 for a read access to the coherence granule 112(0) to the LOP 122(D), which then forwards a request 308 for a read access to the coherence granule 112(0) to the SOP 124. Operations then continue in FIG. 3B.

Figure 3B:
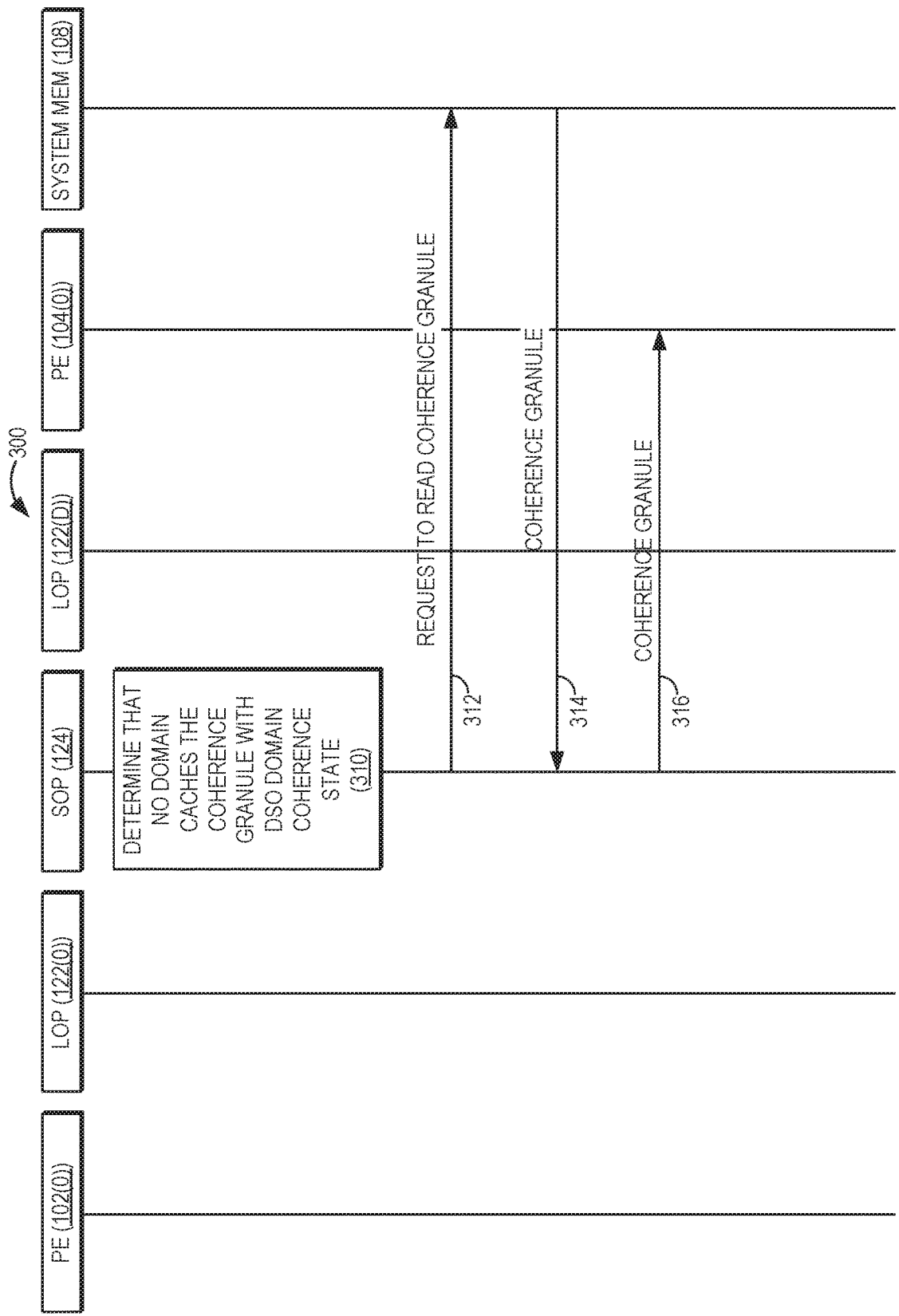

Referring now to FIG. 3B, the SOP 124 determines that the coherence granule 112(0) is cached in the DSN domain coherence state 210 within the domain 106(0) (block 310). Because the SOP 124 knows from the DSN domain coherence state 210 that the coherence granule 112(0) in the system memory 108 is not stale with respect to the copies cached in the domain 106(0), the SOP 124 can read the coherence granule 112(0) from the system memory 108 to satisfy the read access (e.g., in situations in which some of the LOPs 122(0)-122(D) are unable to respond to snoops in a timely manner). Thus, the SOP 124 sends a request 312 to read the coherence granule 112(0) to the system memory 108, and receives the coherence granule 112(0) in response to the request 312, as indicated by arrow 314. The SOP 124 then provides the coherence granule 112(0) to the PE 104(0), as indicated by arrow 316. Operations then continue in FIG. 3C.

Figure 3C:
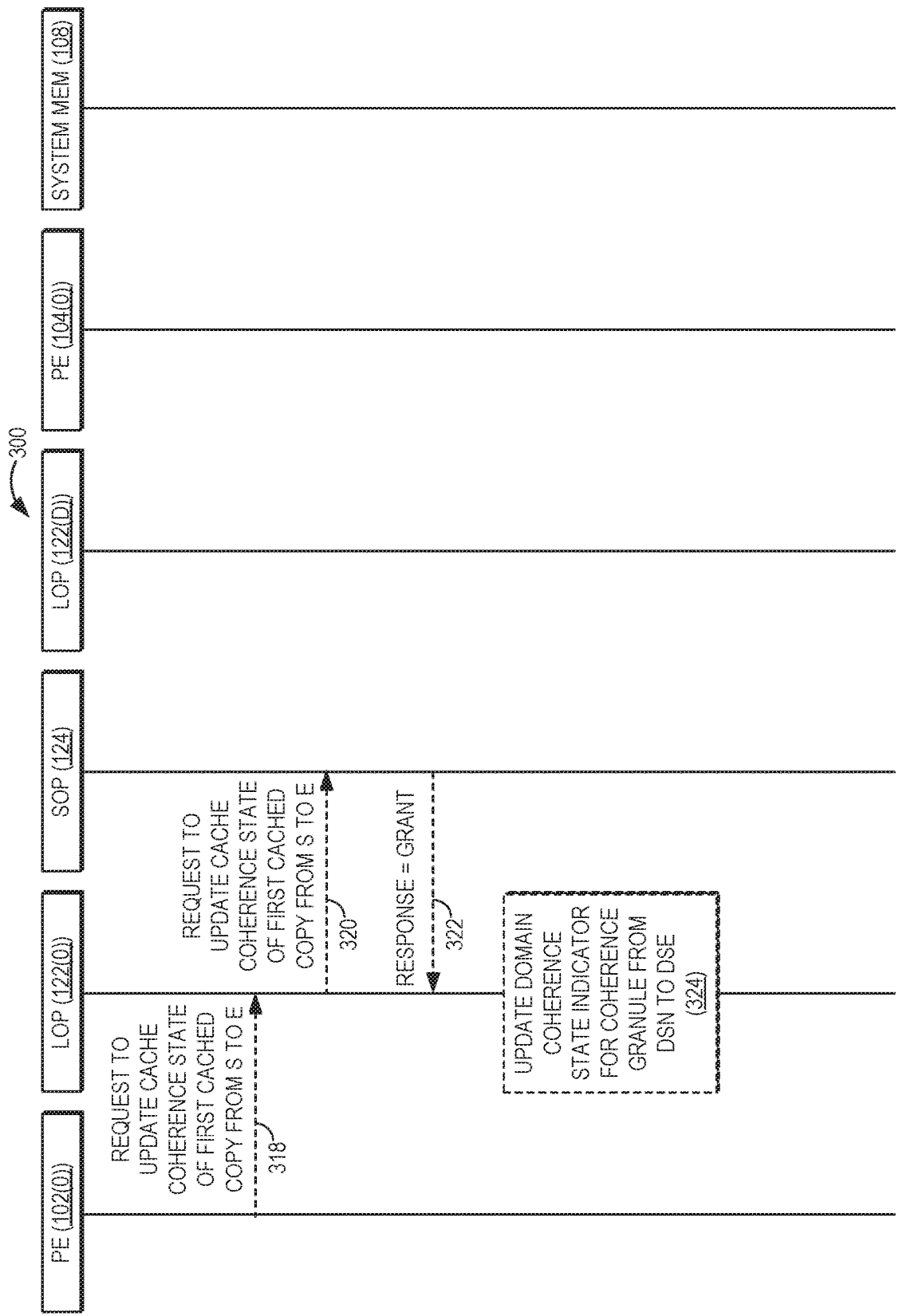
Figure 3D:
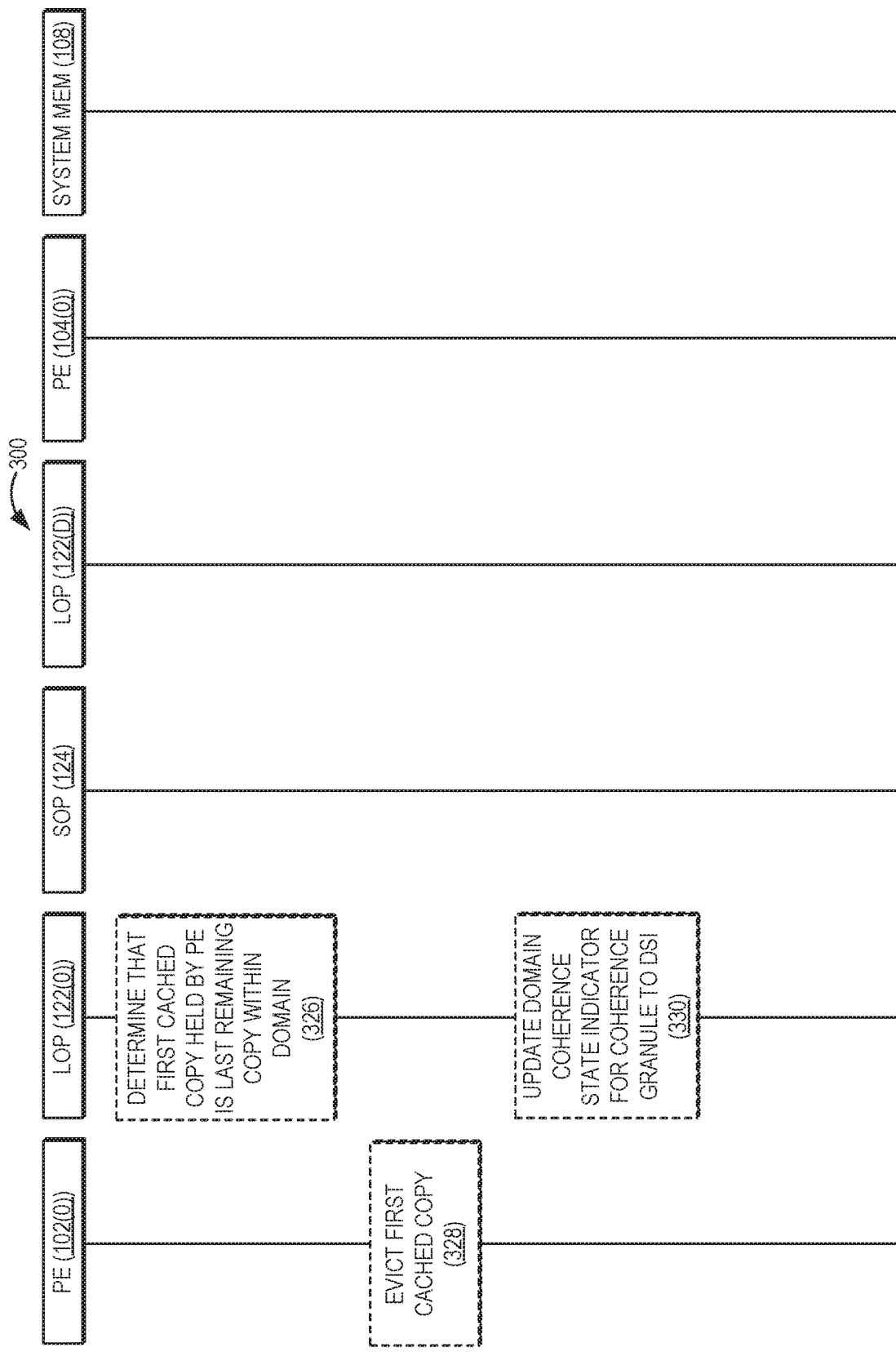

Turning now to FIG. 3C, in some embodiments, a PE within the domain 106(0), such as the PE 102(0), may send a request 318 to the LOP 122(0) to update the cache coherence state for the coherence granule 112(0) from the S cache coherence state to the E cache coherence state. The LOP 122(0) in such embodiments then forwards a request 320 to the SOP 124 to gain permission to upgrade the domain coherence state of the domain 106(0). After the SOP 124 completes a snoop (if necessary) to other domains of the plurality of domains 106(0)-106(D) to instruct them to give up copies of the coherence granule 112(0), and determines that no other cached copies exist in other domains of the plurality of domains 106(0)-106(D), the SOP 124 sends a response 322 granting the request 320. Upon receiving the response 322, the LOP 122(0) in such embodiments updates the domain coherence state indicator 126(0) for the coherence granule 112(0) to indicate that the coherence granule 112(0) is cached with the DSE domain coherence state 202 within the domain 106(0) (block 324). Operations then continue in FIG. 3D. Referring now to FIG. 3D, some embodiments may provide that the LOP 122(0) determines that the first cached copy 120 of the coherence granule 112(0) held by the PE 102(0) is a last remaining copy of the coherence granule 112(0) within the domain 106(0) (block 326). Subsequently, the PE 102(0) evicts the first cached copy 120 (block 328). Upon determining that the PE 102(0) has evicted the first cached copy 120, the LOP 122(0) updates the domain coherence state indicator 126(0) for the coherence granule 112(0) to indicate that the coherence granule 112(0) is cached with the DSI domain coherence state 208 (block 330).

Figure 4A:
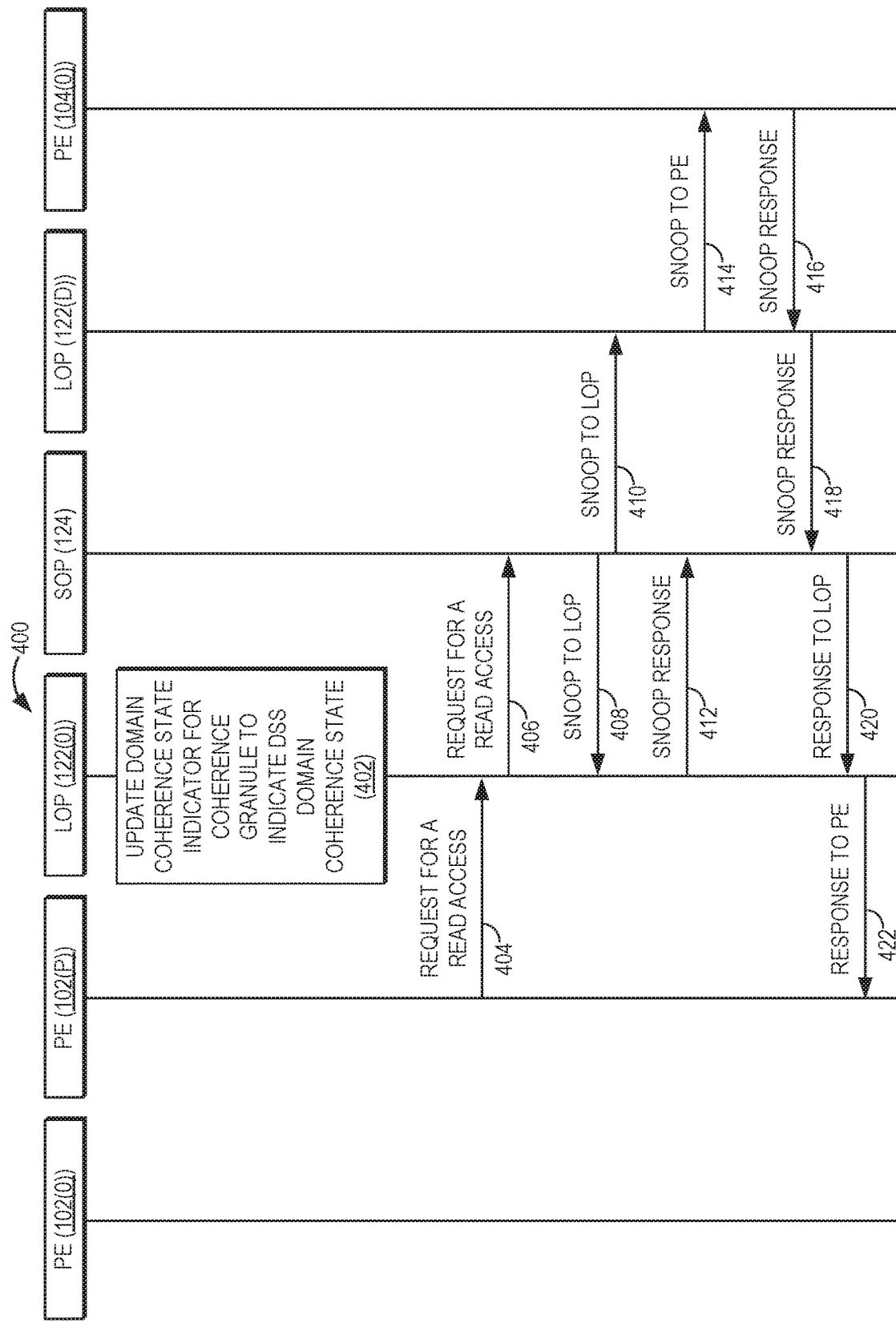
FIGS. 4A-4C are message flow diagrams illustrating exemplary communications flows among and operations performed by elements of FIG. 1 for transitioning from a Domain State Shared (DSS) domain coherence state to the DSN domain coherence state, according to some embodiments.
Figure 4B:
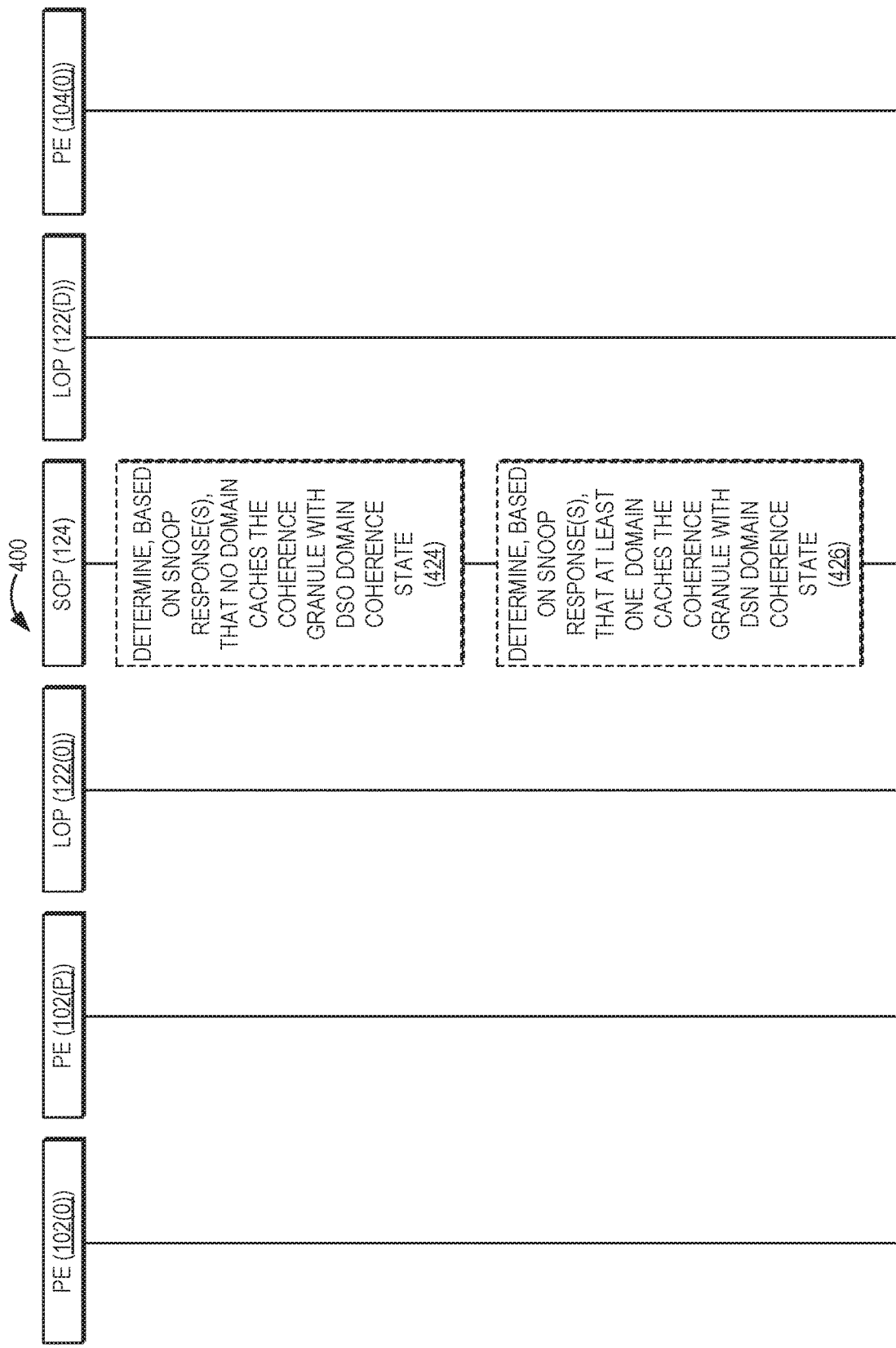
Figure 4C:
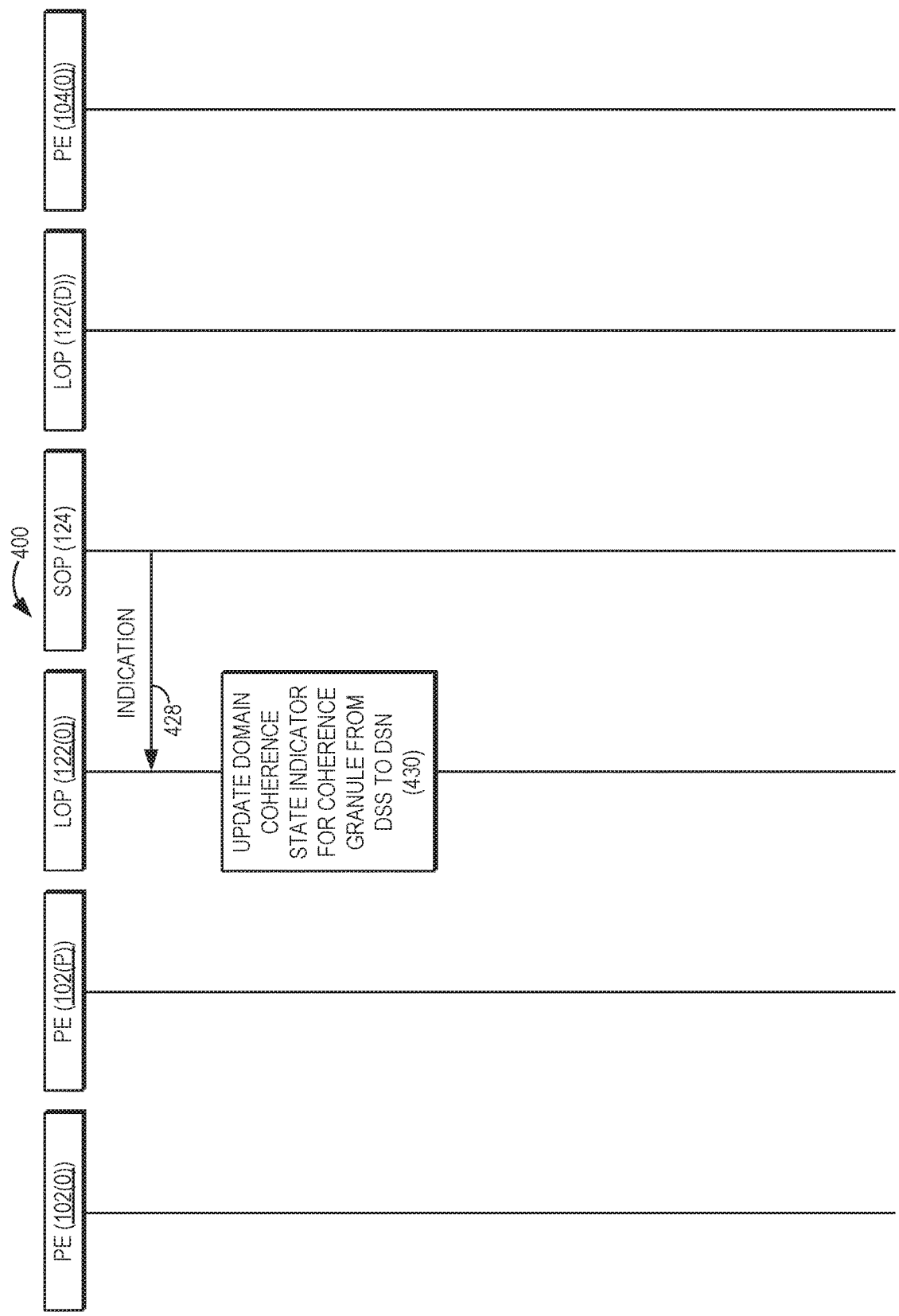

To illustrate exemplary communications flows among and operations performed by elements of FIG. 1 for transitioning from the DSS domain coherence state 204 to the DSN domain coherence state 210 according to some embodiments, FIGS. 4A-4C provide a message flow diagram 400. For the sake of clarity, elements of FIGS. 1 and 2 are referenced in describing FIGS. 4A-4C. The message flow diagram 400 of FIGS. 4A-4C shows the PE 102(0), the PE 102(P), the SOP 124, the LOP 122(D), and the PE 104(0) represented by vertical lines, with communications between these elements illustrated by captioned arrows and operations performed by these elements represented by captioned blocks. It is to be understood that not all of the operations illustrated in FIGS. 4A-4C may be performed by all embodiments, and/or that some operations illustrated in FIGS. 4A-4C may be performed in an order other than illustrated herein.

Operations begin in FIG. 4A with the LOP 122(0) updating the domain coherence state indicator 126(0) for the coherence granule 112(0) to indicate that the coherence granule 112(0) is cached with the DSS domain coherence state 204 within the domain 106(0) (block 402). The PE 102(P) within the domain 106(0) sends a request 404 for a read access to the coherence granule 112(0) to the LOP 122(0), and the LOP 122(0) in turn forwards a request 406 to the SOP 124. The SOP 124, after determining that the domains 106(0) and 106(D) need to be snooped, sends snoops 408 and 410 to the LOPs 122(0) and 122(D), respectively. In the example of FIG. 4A, the LOP 122(0) is already aware that the domain 106(0) does not have the requested data (because it forwarded the request 406 to the SOP 124), so the LOP 122(0) provides a snoop response 412 to the SOP 124 to indicated that its state is unmodified without data. The LOP 122(D) forwards a snoop 414 to the PE 104(0), which sends a snoop response 416 to the LOP 122(D) indicating that its state is unmodified, and that it can satisfy the read request. The LOP 122(D) then provides a snoop response 418 to the SOP 124 to indicate that its domain state is unmodified.

The SOP 124 aggregates the snoop responses 412 and 418 (referred to herein as "one or more snoop responses 412, 418") sent in response to the request 404, and sends a response 420 to the LOP 122(0) in the requesting domain 106(0) to indicate that none of the domains 106(0)-106(D) holds the coherence granule 112(0) in a modified state (or that one of the domains 106(0)-106(D) knows that the coherence granule 112(0) is held in the DSN domain coherence state). The LOP 122(0) can now transition to the DSN domain coherence state. The LOP 122(0) forwards a response 422 to the requesting PE 102(P) that it will receive an unmodified copy of the coherence granule 112(0). Operations then continue in FIG. 4B.

Referring now to FIG. 4B, the SOP 124 in some embodiments may determine, based on the one or more snoop responses 412, 418, that no domain of the plurality of domains 106(0)-106(D) caches the coherence granule 112 (0) with the DSO domain coherence state 206 (block 424). Alternatively, the SOP 124 may determine, based on the one or more snoop responses 412, 418, that at least one domain of the plurality of domains 106(0)-106(D) caches the coherence granule 112(0) with the DSN domain coherence state 210 (block 426). Operations then continue in FIG. 4C.

Turning now to FIG. 4C, if the SOP 124 determines that no domain of the plurality of domains 106(0)-106(D) caches the coherence granule 112(0) with the DSO domain coherence state 206 or that at least one domain of the plurality of domains 106(0)-106(D) caches the coherence granule 112 (0) with the DSN domain coherence state 210, the SOP 124 sends an indication 428 to that effect to the LOP 122(0). Based on the indication 428, the LOP 122(0) can safely conclude that the DSN domain coherence state 210 can be applied to the coherence granule 112(0) for the domain 106(0). Accordingly, the LOP 122(0) updates the domain coherence state indicator 126(0) from the DSS domain coherence state 204 to the DSN domain coherence state 210 (block 430). It is to be understood that, in some embodiments, the LOP 122(0) itself may observe the one or more snoop responses 412, 418, and may determine, based on its own observations, that no domain of the plurality of domains 106(0)-106(D) caches the coherence granule 112(0) with the DSO domain coherence state 206 or that at least one domain of the plurality of domains 106(0)-106(D) caches the coherence granule 112(0) with the DSN domain coherence state 210.

FIG. 5 provides a message flow diagram 500 illustrating exemplary communications flows among and operations performed by elements of FIG. 1 for transitioning from the DSS domain coherence state 204 to the DSN domain coherence state 210 based on receiving a DSO_NOW_CLEAN message, according to some embodiments. Elements of FIGS. 1 and 2 are referenced in describing FIG. 5 for the sake of clarity. As seen in FIG. 5, the message flow diagram 500 shows the LOP 122(0), the SOP 124, and the LOP 122(D) represented by vertical lines, with communications between these elements illustrated by captioned arrows and operations performed by these elements represented by captioned blocks. It is to be understood that not all of the operations illustrated in FIG. 5 may be performed by all embodiments, and/or that some operations illustrated in FIG. 5 may be performed in an order other than illustrated herein.

In FIG. 5, operations begin with the LOP 122(0) updating the domain coherence state indicator 126(0) for the coherence granule 112(0) to indicate that the coherence granule 112(0) is cached with the DSS domain coherence state 204 within the domain 106(0) (block 502). The LOP 122(0) then receives, from the LOP 122 (D) of the domain 106(D) via the SOP 124, a DSO_NOW_CLEAN message 504 indicating that the coherence granule 112, previously cached with the DSO domain coherence state 206 within the domain 106(D), has transitioned to the DSN domain coherence state 210. The LOP 122(D) then updates the domain coherence state indicator 126(0) from the DSS domain coherence state 204 to the DSN domain coherence state 210 (block 506).

To illustrate exemplary communications flows among and operations performed by elements of FIG. 1 for transitioning from the DSO domain coherence state 206 to the DSN domain coherence state 210 according to some embodiments. FIG. 6 provides a message flow diagram 600. For the sake of clarity, elements of FIGS. 1 and 2 are referenced in describing FIG. 6. The message flow diagram 600 of FIG. 6 shows the LOP 122(0), the system memory 108 ("SYSTEM MEM"), and the LOP 122(D) represented by vertical lines, with communications between these elements illustrated by captioned arrows and operations performed by these elements represented by captioned blocks. It is to be understood that not all of the operations illustrated in FIG. 6 may be performed by all embodiments, and/or that some operations illustrated in FIG. 6 may be performed in an order other than illustrated herein.

Operations in FIG. 6 begin with the LOP 122(0) updating the domain coherence state indicator 126(0) for the coherence granule 112(0) to indicate that the coherence granule 112(0) is cached with the DSO domain coherence state 206 within the domain 106(0) (block 602). The LOP 122(0) subsequently writes the first cached copy 120 to the coherence granule 112(0) in the system memory 108. Because the LOP 122(0) is aware that the first cached copy 120 was in the O cache coherence state (i.e., shared modified) and was written to the system memory 108, the LOP 122(0) can conclude that no other domain among the plurality of domains 106(0)-106(D) holds a copy of the coherence granule 112(0) in the O coherence state. Accordingly, the LOP 122(0) updates the domain coherence state indicator 126(0) from the DSO domain coherence state 206 to the DSN domain coherence state 210 (block 604). In some embodiments, the LOP 122(0) may also transmit, to other LOPs such as the LOP 122(D), a DSO_NOW_CLEAN message 606 indicating that the coherence granule 112(0) has transitioned to the DSN domain coherence state 210. The LOP 122(D) in turn may transition to the DSN domain coherence state 210 for the coherence granule 112(0) in response to receiving the DSO_NOW_CLEAN message 606. It is to be understood that, in some embodiments, the SOP 124 of FIG. 1 may send a DSO_NOW_CLEAN message to the LOPs 122(0)-122(D) when the SOP 124 accepts a writeback from one of the domains 106(0)-106(D) holding the coherence granule 112(0) in the DSO domain coherence state 206.

FIG. 7 provides a message flow diagram 700 illustrating exemplary communications flows among and operations performed by elements of FIG. 1 for transitioning from the DSE domain coherence state 202 to the DSN domain coherence state 210, according to some embodiments. Elements of FIGS. 1 and 2 are referenced in describing FIG. 7 for the sake of clarity. In FIG. 7, the message flow diagram 700 shows the PE 102(0), the LOP 122(0), and the PE 104(0) represented by vertical lines, with communications between these elements illustrated by captioned arrows and operations performed by these elements represented by captioned blocks. It is to be understood that not all of the operations illustrated in FIG. 7 may be performed by all embodiments, and/or that some operations illustrated in FIG. 7 may be performed in an order other than illustrated herein.

Operations in FIG. 7 begin with the LOP 122(0) updating the domain coherence state indicator 126(0) for the coherence granule 112(0) to indicate that the coherence granule 112(0) is cached with the DSE domain coherence state 202 within the domain 106(0) (block 702). The PE 102(0) then provides a shared copy 704 of the coherence granule 112(0) to the PE 104(0) within the domain 106(D). In the example of FIG. 7, the PE 102(0) will have sent a snoop response (not shown) to indicate that it will provide the shared copy 704 to the PE 104(0). The LOP 122(0) in this example concludes, based on the snoop response, that the first cached copy 120 held by the PE 102(0) was not modified. Accordingly, the LOP 122(0) updates the domain coherence state indicator 126(0) from the DSE domain coherence state 202 to the DSN domain coherence state 210 (block 706).

To illustrate exemplary communications flows among and operations performed by elements of FIG. 1 for transitioning from the DSI domain coherence state 208 to the DSN domain coherence state 210 according to some embodiments. FIG. 8 provides a message flow diagram 800. For the sake of clarity, elements of FIGS. 1 and 2 are referenced in describing FIG. 8. The message flow diagram 800 of FIG. 8 shows the PE 102(0), the LOP 122(0), and the SOP 124 represented by vertical lines, with communications between these elements illustrated by captioned arrows and operations performed by these elements represented by captioned blocks. It is to be understood that not all of the operations illustrated in FIG. 8 may be performed by all embodiments, and/or that some operations illustrated in FIG. 8 may be performed in an order other than illustrated herein.

In FIG. 8, operations begin with the LOP 122(0) updating the domain coherence state indicator 126(0) for the coherence granule 112(0) to indicate that the coherence granule 112(0) has the DSI domain coherence state 208 within the domain 106(0) (block 802). The LOP 122(0) then receives a request 804 for the coherence granule 112(0) by the first PE 102(0), and forwards a corresponding request 806 to the SOP 124. The LOP 122(0) subsequently receives a response 808 from the SOP 124 indicating that none of the domains 106(0)-106(D) holds a modified copy of the coherence granule 112(0) (i.e., no domain 106(0)-106(D) holds a copy of the coherence granule 112(0) in the O or M cache coherence states). The LOP 122(0) then updates the domain coherence state indicator 126(0) for the coherence granule 112(0) by updating the domain coherence state indicator 126(0) from the DSI domain coherence state 208 to the DSN domain coherence state 210 (block 810).

Figure 9A:
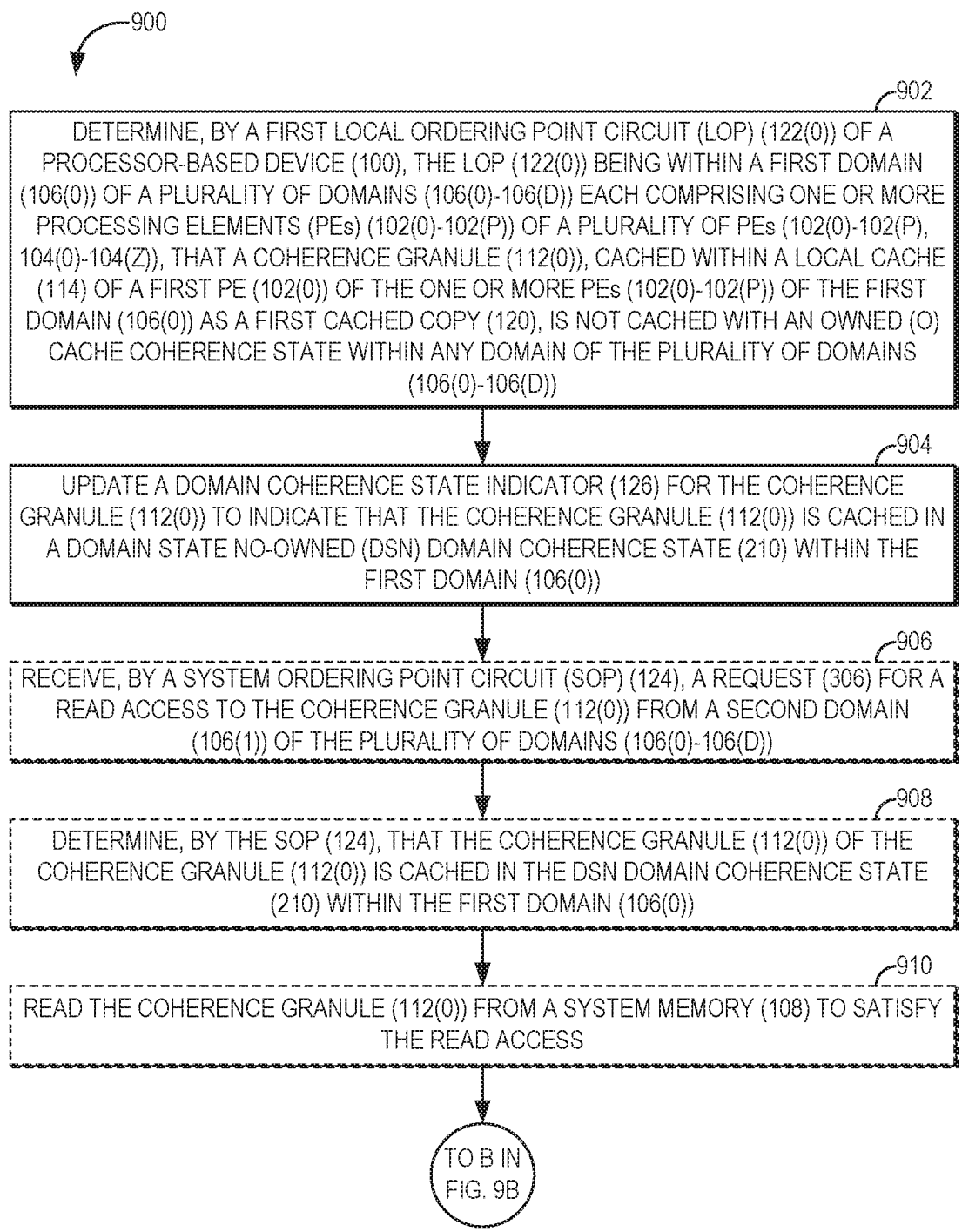
FIGS. 9A and 9B are flowcharts illustrating exemplary operations for maintaining domain coherence states, including the DSN domain coherence state, and for transitioning from the DSN domain coherence state to the DSE or DSI domain coherence states, according to some embodiments.
Figure 9B:
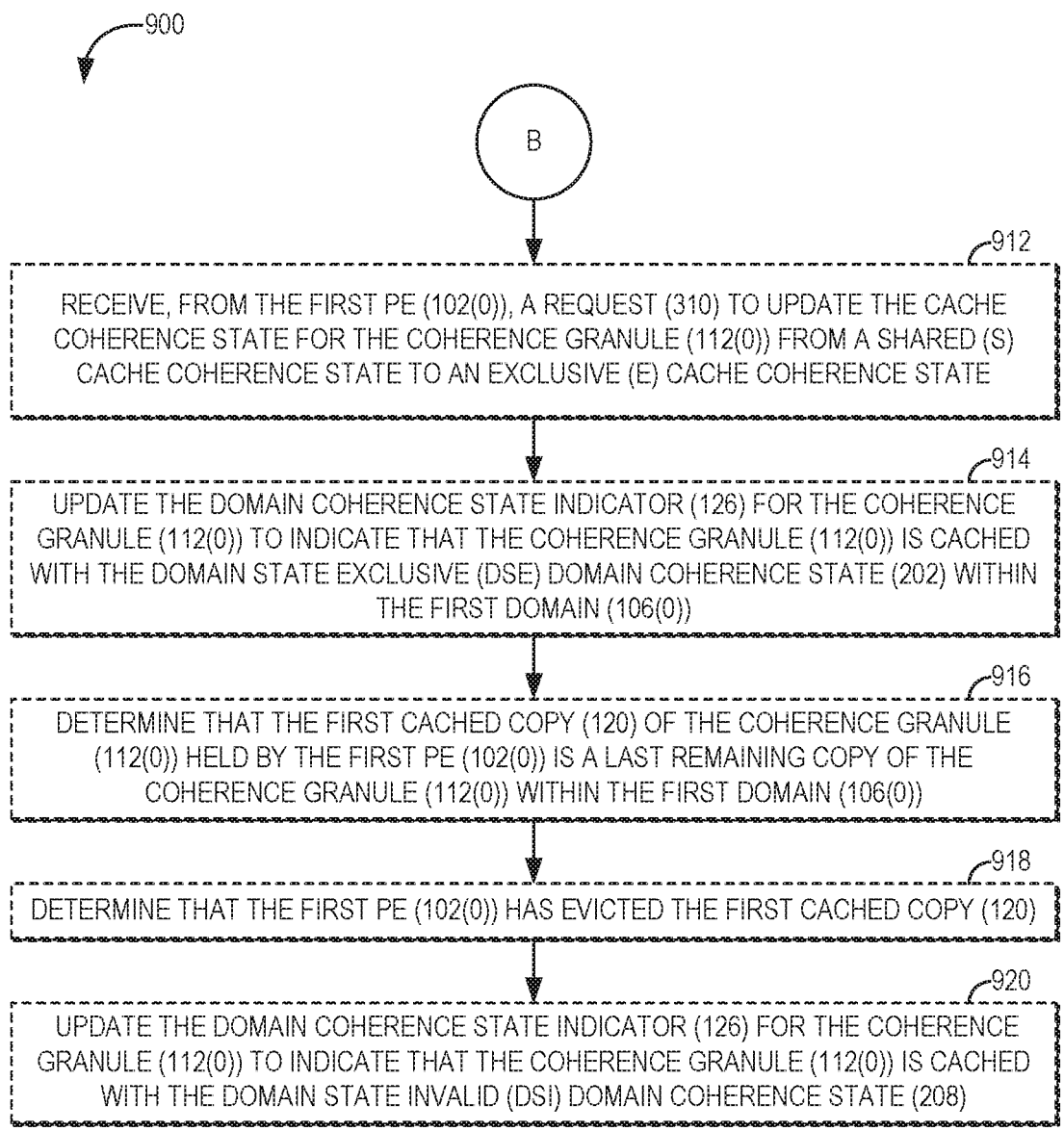

FIGS. 9A and 9B provide a flowchart 900 illustrating exemplary operations for maintaining domain coherence states, including the DSN domain coherence state 210, and for transitioning from the DSN domain coherence state 210 to the DSE domain coherence state 202 or the DSI domain coherence state 208, according to some embodiments. For the sake of clarity, elements of FIGS. 1, 2, and 3A-3D are referenced in describing FIGS. 9A and 9B. The description of FIGS. 9A and 9B refers to the LOP 122 of FIG. 1 as the "first LOP 122(0)," refers to the domain 106(0) of FIG. 1 as the "first domain 106(0)," refers to the PE 102(0) of FIG. 1 as the "first PE 102(0)," and refers to the cached copy 120 of FIG. 1 as the "first cached copy 120."

In FIG. 9A, operations begin with the first LOP 122(0) of the first domain 106(0) of FIG. 1 of the plurality of domains 106(0)-106(D) each comprising the one or more PEs 102(0)-102(P) of the plurality of PEs 102(0)-102(P), 104(0)-104(Z), determining that the coherence granule 112(0), cached within the local cache 114 of the first PE 102(0) of the one or more PEs 102(0)-102(P) of the first domain 106(0) as the first cached copy 120, is not cached with an O cache coherence state within any domain of the plurality of domains 106(0)-106(D) (block 902). The first LOP 122(0) then updates the domain coherence state indicator 126(0) for the coherence granule 112(0) to indicate that the coherence granule 112(0) is cached in the DSN domain coherence state 210 within the first domain 106(0) (block 904). Operations for performing the functionality described in blocks 902 and 904 in some embodiments are discussed in greater detail below with respect to FIGS. 10-15.

The SOP 124 subsequently receives the request 308 for a read access to the coherence granule 112(0) from a second domain, such as a domain 106(1) of FIG. 1 (block 906). The SOP 124 determines that the coherence granule 112(0) is cached in the DSN domain coherence state 210 within the first domain 106(0) (block 908). The SOP 124 then reads the coherence granule 112(0) from the system memory 108 to satisfy the read access (i.e., instead of waiting for a snoop response from an unresponsive domain) (block 910). Processing in some embodiments then continues at block 912 of FIG. 9B.

Referring now to FIG. 9B, according to some embodiments, the first LOP 122(0) may receive, from the first PE 102(0), the request 318 to update the cache coherence state for the first cached copy 120 of the coherence granule 112(0) from the S cache coherence state to the E cache coherence state (block 912). The first LOP 122(0) then updates the domain coherence state indicator 126(0) for the coherence granule 112(0) to indicate that the coherence granule 112(0) is cached with the DSE domain coherence state 202 within the first domain 106(0) (i.e., after the LOP 122(0) forwards the request 320 to the SOP 124 and subsequently receives the response 322 granting the request 320) (block 914).

Some embodiments may provide that the first LOP 122(0) determines that the first cached copy 120 of the coherence granule 112(0) held by the first PE 102(0) is a last remaining copy of the coherence granule 112(0) within the first domain 106(0) (block 916). The first LOP 122(0) subsequently determines that the first PE 102(0) has evicted the first cached copy 120 (block 918). In response, the first LOP 122(0) updates the domain coherence state indicator 126(0) for the coherence granule 112(0) to indicate that the coherence granule 112(0) is cached with the DSI domain coherence state 208 (block 920).

Figure 10:
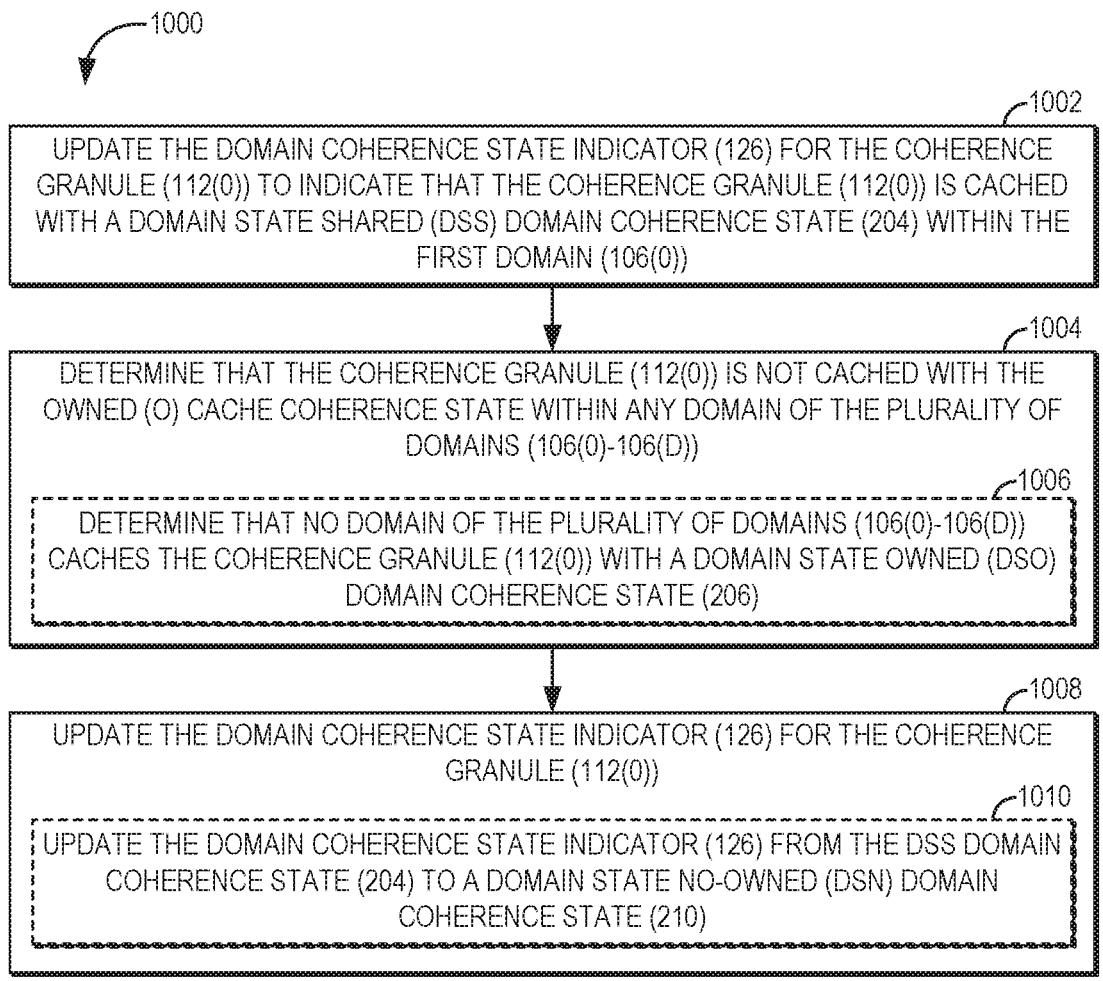
FIG. 10 is a flowchart illustrating exemplary operations for transitioning from the DSS domain coherence state to the DSN domain coherence state, according to some embodiments.

To illustrate exemplary operations for transitioning from the DSS domain coherence state 204 to the DSN domain coherence state 210 according to some embodiments, FIG. 10 provides a flowchart 1000. For the sake of clarity, elements of FIGS. 1, 2, and 4A-4C are referenced in describing FIG. 10. The description of FIG. 10 below refers to the LOP 122(0) of FIG. 1 as the "first LOP 122(0)," refers to the domain 106(0) of FIG. 1 as the "first domain 106(0)," and refers to the PE 102(P) of FIG. 1 as the "second PE 102(P)."

Operations in FIG. 10 begin with the first LOP 122(0) updating the domain coherence state indicator 126(0) for the coherence granule 112(0) to indicate that the coherence granule 112(0) is cached with the DSS domain coherence state 204 within the first domain 106(0) (block 1002). As described above with respect to block 902 of FIG. 9A, the first LOP 122(0) determines that the coherence granule 112(0) is not cached with the O cache coherence state within any domain of the plurality of domains 106(0)-106(D) (block 1004). In the example of FIG. 10, the operations of block 1004 for determining that the coherence granule 112(0) is not cached with the O cache coherence state within any of the domains 106(0)-106(D) include the first LOP 122(0) determining that no domain of the plurality of domains 106(0)-106(D) caches the coherence granule 112(0) with DSO domain coherence state 206 (block 1006).

In some embodiments, the operations of block 1006 for determining that no domain of the plurality of domains 106(0)-106(D) caches the coherence granule 112(0) with DSO domain coherence state 206 may be based on the LOP 122(0) observing the one or more snoop responses 412, 418 sent in response to the request 404 for a read access to the coherence granule 112(0) sent by the second PE 102(P) of the plurality of PEs 102(0)-102(P), 104(0)-104(P). Some embodiments may provide that the SOP 124 observes the one or more snoop responses 412, 418 sent in response to the request 404, and determines, based on the one or more snoop responses 412, 418, that no domain of the plurality of domains 106(0)-106(D) caches the coherence granule 112(0) with DSO domain coherence state 206. The SOP 124 may then send the indication 428 to the first LOP 122(0), which may base its determination on the indication 428.

As described above with respect to block 904 of FIG. 9A, the first LOP 122(0) then updates the domain coherence state indicator 126(0) for the coherence granule 112(0) (block 1008). In the example of FIG. 10, the operations of block 1010 for updating the domain coherence state indicator 126(0) comprise updating the domain coherence state indicator 126(0) from the DSS domain coherence state 204 to the DSN domain coherence state 210 (block 1010).

Figure 11:
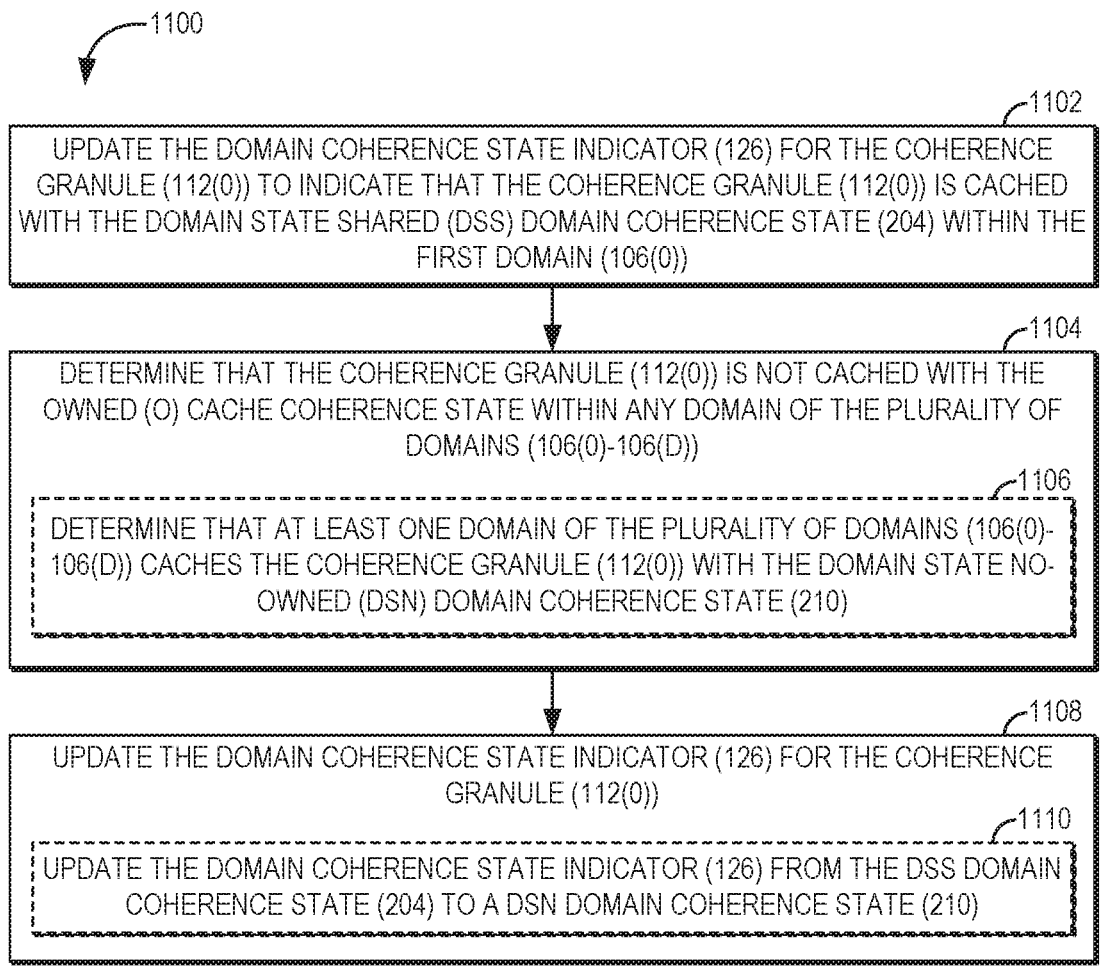
FIG. 11 is a flowchart illustrating additional exemplary operations for transitioning from the DSS domain coherence state to the DSN domain coherence state, according to some embodiments.

FIG. 11 provides a flowchart 1100 illustrating additional exemplary operations for transitioning from the DSS domain coherence state 204 to the DSN domain coherence state 210, according to some embodiments. For the sake of clarity, elements of FIGS. 1, 2, and 4A-4C are referenced in describing FIG. 11. The description of FIG. 11 below refers to the LOP 122(0) of FIG. 1 as the "first LOP 122(0)," refers to the domain 106(0) of FIG. 1 as the "first domain 106(0)," and refers to the PE 102(P) of FIG. 1 as the "second PE 102(P)."

In FIG. 11, operations begin with the first LOP 122(0) updating the domain coherence state indicator 126(0) for the coherence granule 112(0) to indicate that the coherence granule 112(0) is cached with the DSS domain coherence state 204 within the first domain 106(0) (block 1102). As described above with respect to block 902 of FIG. 9A, the first LOP 122(0) determines that the coherence granule 112(0) is not cached with the O cache coherence state within any domain of the plurality of domains 106(0)-106(D) (block 1104). In the example of FIG. 11, the operations of block 1104 for determining that the coherence granule 112(0) is not cached with the O cache coherence state within any of the domains 106(0)-106(D) comprise the first LOP 122(0) determining that at least one domain of the plurality of domains 106(0)-106(D) caches the coherence granule 112(0) with the DSN domain coherence state 210 (block 1106).

According to some embodiments, the operations of block 1106 for determining that at least one domain of the plurality of domains 106(0)-106(D) caches the coherence granule 112(0) with the DSN domain coherence state 210 may be based on the LOP 122(0) observing the one or more snoop responses 412, 418 sent in response to the request 404 for a read access to the coherence granule 112(0) sent by the second PE 102(P) of the plurality of PEs 102(0)-102(P). 104(0)-104(P). In some embodiments, the SOP 124 may observe the one or more snoop responses 412, 418 sent in response to the request 404, and determine, based on the one or more snoop responses 412, 418, that at least one domain of the plurality of domains 106(0)-106(D) caches the coherence granule 112(0) with the DSN domain coherence state 210. The SOP 124 may then send the indication 428 to the first LOP 122(0), which may base its determination on the indication 428.

As described above with respect to block 904 of FIG. 9A, the first LOP 122(0) then updates the domain coherence state indicator 126(0) for the coherence granule 112(0) (block 1108). In the example of FIG. 11, the operations of block 1110 for updating the domain coherence state indicator 126(0) comprise updating the domain coherence state indicator 126(0) from the DSS domain coherence state 204 to the DSN domain coherence state 210 (block 1110).

Figure 12:
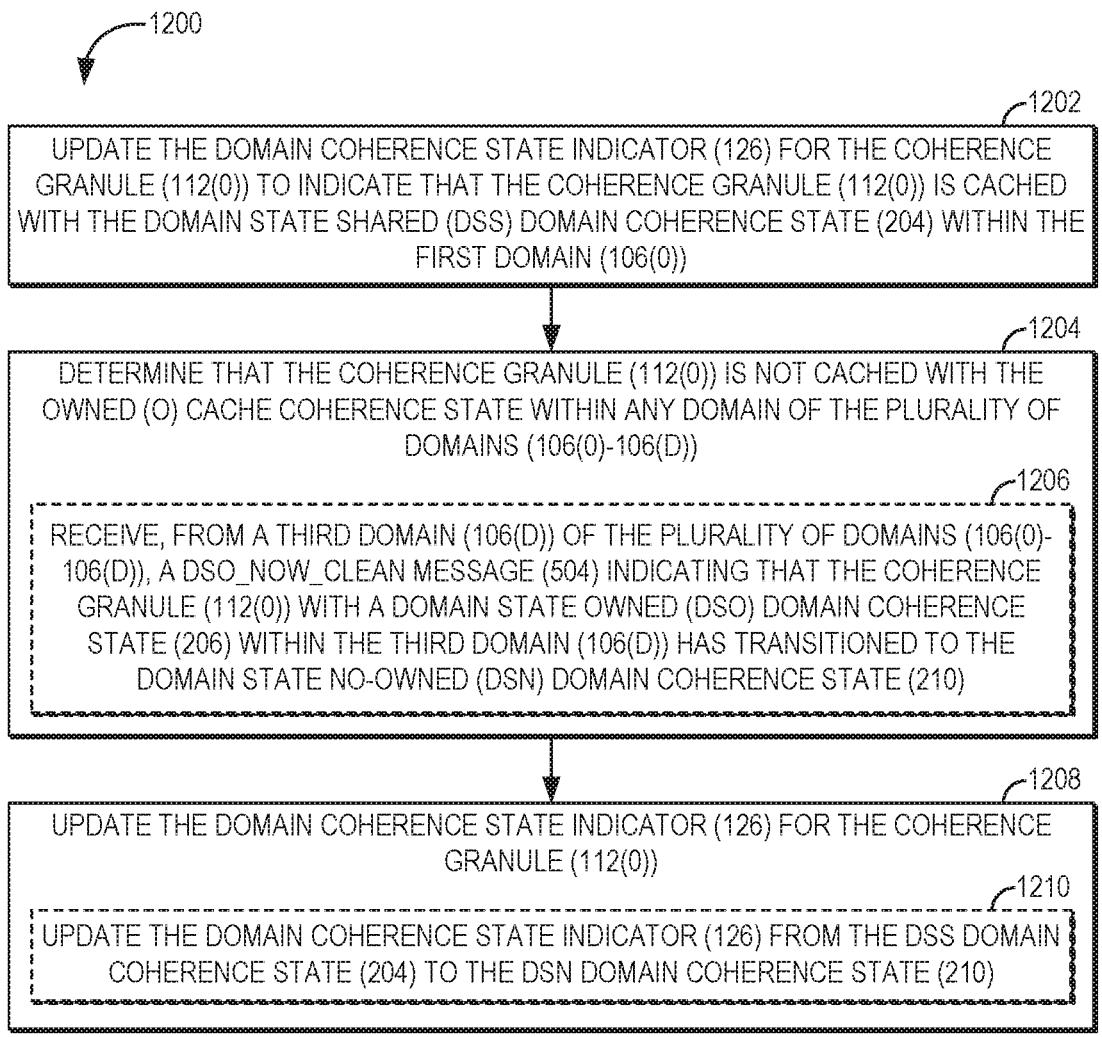
FIG. 12 is a flowchart illustrating exemplary operations for transitioning from the DSS domain coherence state to the DSN domain coherence state based on receiving a DSO_NOW_CLEAN message, according to some embodiments.

To illustrate exemplary operations for transitioning from the DSS domain coherence state 204 to the DSN domain coherence state 210 based on receiving the DSO_NOW_CLEAN message 504 according to some embodiments. FIG. 12 provides a flowchart 1200. For the sake of clarity, elements of FIGS. 1, 2, and 5 are referenced in describing FIG. 12. The description of FIG. 12 below refers to the LOP 122(0) of FIG. 1 as the "first LOP 122(0)," refers to the domain 106(0) of FIG. 1 as the "first domain 106(0)." and refers to the domain 106(D) of FIG. 1 as the "third domain 106(D)."

Operations in FIG. 12 begin with the first LOP 122(0) updating the domain coherence state indicator 126(0) for the coherence granule 112(0) to indicate that the coherence granule 112(0) is cached with the DSS domain coherence state 204 within the first domain 106(0) (block 1202). As described above with respect to block 902 of FIG. 9A, the first LOP 122(0) determines that the coherence granule 112(0) is not cached with the O cache coherence state within any domain of the plurality of domains 106(0)-106(D) (block 1204). In the example of FIG. 12, the operations of block 1204 for determining that the coherence granule 112(0) is not cached with the O cache coherence state within any of the domains 106(0.0)-106(D) include the LOP 122(0) receiving, from the third domain 106(D) of the plurality of domains 106(0)-106(D), the DSO_NOW_CLEAN message 504 indicating that the coherence granule 112(0) with a DSO domain coherence state 206 within the third domain 106(D) has transitioned to the DSN domain coherence state 210 (block 1206). It is to be understood that the LOP 122(0) in some embodiments may receive the DSO_NOW_CLEAN message 504 directly from the third domain 106(D), while some embodiments may provide that the LOP 122(0) may receive the DSO_NOW_CLEAN message 504 indirectly from the third domain 106(D) via the SOP 124 (e.g., the third domain 106(D) may transmit the DSO_NOW_CLEAN message 504 to the SOP 124, which then forwards it to the LOP 122(0)).

As described above with respect to block 904 of FIG. 9A, the first LOP 122(0) then updates the domain coherence state indicator 126(0) for the coherence granule 112(0) (block 1208). In the example of FIG. 12, the operations of block 1208 for updating the domain coherence state indicator 126(0) comprise updating the domain coherence state indicator 126(0) from the DSS domain coherence state 204 to the DSN domain coherence state 210 (block 1210).

Figure 13:
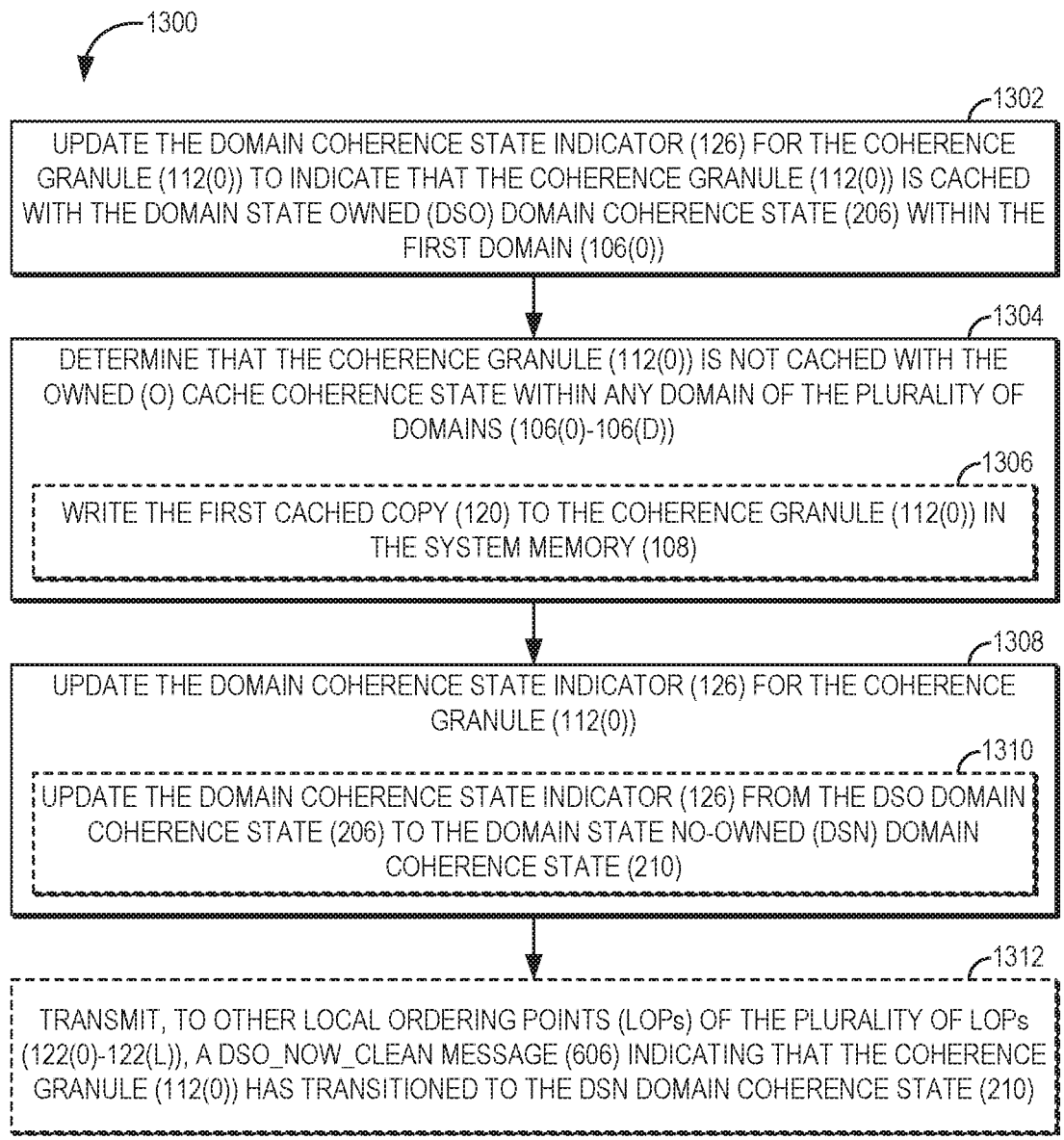
FIG. 13 is a flowchart illustrating exemplary operations for transitioning from a DSO domain coherence state to the DSN domain coherence state, according to some embodiments.

FIG. 13 provides a flowchart 1300 illustrating exemplary operations for transitioning from the DSO domain coherence state 206 to the DSN domain coherence state 210, according to some embodiments. For the sake of clarity, elements of FIGS. 1, 2, and 6 are referenced in describing FIG. 13. The description of FIG. 13 below refers to the LOP 122(0) of FIG. 1 as the "first LOP 122(0)." refers to the cached copy 120 of FIG. 1 as the "first cached copy 120," and refers to the domain 106(0) of FIG. 1 as the "first domain 106(0)."

In FIG. 13, operations begin with the first LOP 122(0) updating the domain coherence state indicator 126(0) for the coherence granule 112(0) to indicate that the coherence granule 112(0) is cached with the DSO domain coherence state 206 within the first domain 106(0) (block 1302). As described above with respect to block 902 of FIG. 9A, the first LOP 122(0) determines that the coherence granule 112(0) is not cached with the O cache coherence state within any domain of the plurality of domains 106(0)-106(D) (block 1304). In the example of FIG. 13, the operations of block 1304 for determining that the coherence granule 112(0) is not cached with the O cache coherence state within any of the domains 106(0)-106(D) comprise the first LOP 122(0) writing the first cached copy 120 to the coherence granule 112(0) in the system memory 108 (block 1308).

As described above with respect to block 904 of FIG. 9A, the first LOP 122(0) then updates the domain coherence state indicator 126(0) for the coherence granule 112(0) (block 1308). In the example of FIG. 13, the operations of block 1308 for updating the domain coherence state indicator 126(0) comprise updating the domain coherence state indicator 126(0) from the DSO domain coherence state 206 to the DSN domain coherence state 210 (block 1310). In some embodiments, the first LOP 122(0) may also transmit, to other LOPs of the plurality of LOPs 122(0)-122(L), the DSO_NOW_CLEAN message 606 indicating that the coherence granule 112(0) has transitioned to the DSN domain coherence state 210 (block 1312). It is to be understood that operations of block 1312 for transmitting the DSO_NOW_CLEAN message 606 may comprise the first LOP 122(0) transmitting the DSO_NOW_CLEAN message 606 directly to the other LOPs, or may comprise the first LOP 122(0) transmitting the DSO_NOW_CLEAN message 606 to the SOP 124, which in turn transmits the DSO_NOW_CLEAN message 606 on to other LOPs of the plurality of LOPs 122(0)-122(L). In some embodiments, the SOP 124 may transmit the DSO_NOW_CLEAN message 606 to other LOPs of the plurality of LOPs 122(0)-122(L) in response to the SOP 124 observing the first LOP 122(0) cleaning the coherence granule 112(0) to the system memory 108 (i.e., updating the system memory 108 with the data stored in the first LOP 122(0)'s copy of the coherence granule 112(0), while the first LOP 122(0) keeps its copy of the coherence granule 112(0)).

Figure 14:
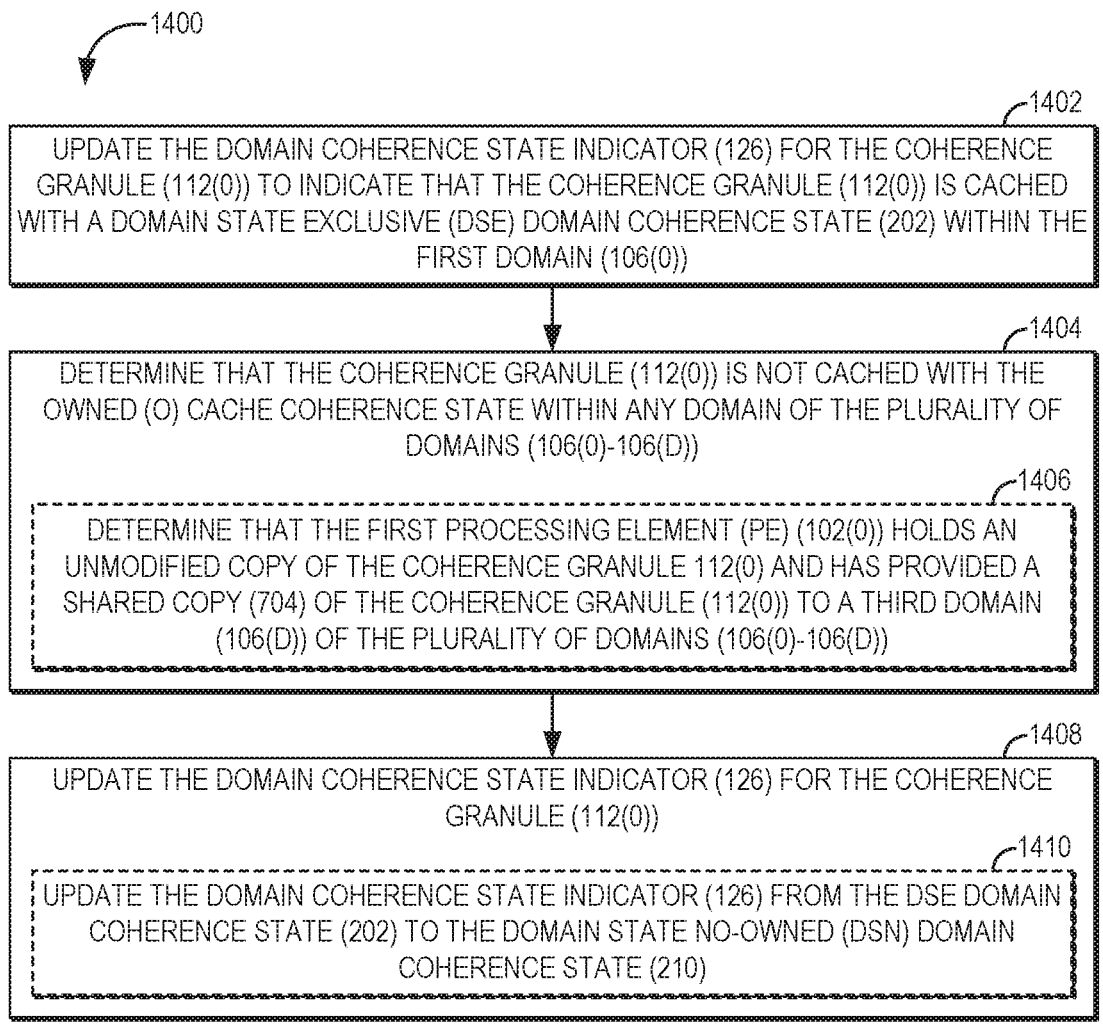
FIG. 14 is a flowchart illustrating exemplary operations for transitioning from a DSE domain coherence state to the DSN domain coherence state, according to some embodiments.

To illustrate exemplary operations for transitioning from the DSE domain coherence state 202 to the DSN domain coherence state 210 according to some embodiments, FIG. 14 provides a flowchart 1400. For the sake of clarity, elements of FIGS. 1, 2, and 7 are referenced in describing FIG. 14. The description of FIG. 14 below refers to the LOP 122(0) of FIG. 1 as the "first LOP 122(0)," refers to the domain 106(0) of FIG. 1 as the "first domain 106(0)," refers to the PE 102(0) of FIG. 1 as the "first PE 102(0)." and refers to the domain 106(D) of FIG. 1 as the "third domain 106(D)."

Operations in FIG. 14 begin with the first LOP 122(0) updating the domain coherence state indicator 126(0) for the coherence granule 112(0) to indicate that the coherence granule 112(0) is cached with the DSE domain coherence state 202 within the first domain 106(0) (block 1402). As described above with respect to block 902 of FIG. 9A, the first LOP 122(0) determines that the coherence granule 112(0) is not cached with the O cache coherence state within any domain of the plurality of domains 106(0)-106(D) (block 1404). In the example of FIG. 14, the operations of block 1404 for determining that the coherence granule 112(0) is not cached with the O cache coherence state within any of the domains 106(0)-106(D) include the first LOP 122(0) determining that the first PE 102(0) holds an unmodified copy of the coherence granule 112(0) and has provided a shared copy 704 of the coherence granule 112(0) to a third domain 106(D) of the plurality of domains 106(0)-106(D) (block 1406).

As described above with respect to block 904 of FIG. 9A, the first LOP 122(0) then updates the domain coherence state indicator 126(0) for the coherence granule 112(0) (block 1408). In the example of FIG. 14, the operations of block 1408 for updating the domain coherence state indicator 126(0) comprise updating the domain coherence state indicator 126(0) from the DSE domain coherence state 202 to the DSN domain coherence state 210 (block 1410).

FIG. 15 provides a flowchart 1500 illustrating exemplary operations for transitioning from the DSI domain coherence state 208 to the DSN domain coherence state 210, according to some embodiments. For the sake of clarity, elements of FIGS. 1, 2, and 8 are referenced in describing FIG. 15. The description of FIG. 15 below refers to the LOP 122(0) of FIG. 1 as the "first LOP 122(0)," and refers to the PE 102(0) of FIG. 1 as the "first PE 102(0)."

In some embodiments, operations in FIG. 15 begin with the first LOP 122(0) updating the domain coherence state indicator 126(0) for the coherence granule 112(0) to indicate that the coherence granule 112(0) has the DSI domain coherence state 208 within the first domain 106(0) (block 1502). As described above with respect to block 902 of FIG. 9A, the first LOP 122(0) determines that the coherence granule 112(0) is not cached with the O cache coherence state within any domain of the plurality of domains 106(0)-106(D) (block 1504). In the example of FIG. 15, the operations of block 1504 for determining that the coherence granule 112(0) is not cached with the O cache coherence state within any of the domains 106(0)-106(D) comprise the first LOP 122(0) determining, responsive to the request 804 for the coherence granule 112(0) by the first PE 102(0), that no domain of the plurality of domains 106(0)-106(D) caches a modified copy of the coherence granule 112(0) (block 1506).

As described above with respect to block 904 of FIG. 9A, the first LOP 122(0) then updates the domain coherence state indicator 126(0) for the coherence granule 112(0) (block 1508). In the example of FIG. 15, the operations of block 1308 for updating the domain coherence state indicator 126(0) comprise updating the domain coherence state indicator 126(0) from the DSI domain coherence state 208 to the DSN domain coherence state 210 (block 1510).

FIG. 16 is a block diagram of an exemplary processor-based device 1600, such as the processor-based device 100 of FIG. 1, that maintains domain coherence states including the DSN domain coherence state. The processor-based device 1600 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 1600 includes a processor 1602. The processor 1602 represents one or more general-purpose processing circuits, such as a microprocessor, central processing unit, or the like, and may correspond to the PEs 102(0)-102(P) of FIG. 1. The processor 1602 is configured to execute processing logic in instructions for performing the operations and steps discussed herein. In this example, the processor 1602 includes an instruction cache 1604 for temporary, fast access memory storage of instructions and an instruction processing circuit 1610. Fetched or prefetched instructions from a memory, such as from a system memory 1608 over a system bus 1606, are stored in the instruction cache 1604. The instruction processing circuit 1610 is configured to process instructions fetched into the instruction cache 1604 and process the instructions for execution.

The processor 1602 and the system memory 1608 are coupled to the system bus 1606 and can intercouple peripheral devices included in the processor-based device 1600. As is well known, the processor 1602 communicates with these other devices by exchanging address, control, and data information over the system bus 1606. For example, the processor 1602 can communicate bus transaction requests to a memory controller 1612 in the system memory 1608 as an example of a peripheral device. Although not illustrated in FIG. 16, multiple system buses 1606 could be provided, wherein each system bus constitutes a different fabric. In this example, the memory controller 1612 is configured to provide memory access requests to a memory array 1614 in the system memory 1608. The memory array 1614 is comprised of an array of storage bit cells for storing data. The system memory 1608 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1606. As illustrated in FIG. 16, these devices can include the system memory 1608, one or more input device(s) 1616, one or more output device(s) 1618, a modem 1624, and one or more display controller(s) 1620, as examples. The input device(s) 1616 can include any type of input device, including, but not limited to, input keys, switches, voice processors, etc. The output device(s) 1618 can include any type of output device, including, but not limited to, audio, video, other visual indicators, etc. The modem 1624 can be any device configured to allow exchange of data to and from a network 1626. The network 1626 can be any type of network, including, but not limited to, a wired or wireless network, a private or public network, a local area network (LAN), a wireless local area network (WLAN), a wide area network (WAN), a BLUETOOTH™ network, and the Internet. The modem 1624 can be configured to support any type of communications protocol desired. The processor 1602 may also be configured to access the display controller(s) 1620 over the system bus 1606 to control information sent to one or more display(s) 1622. The display(s) 1622 can include any type of display, including, but not limited to, a cathode ray tube (CRT), a liquid crystal display (LCD), a plasma display, etc.

The processor-based device 1600 in FIG. 16 may include a set of instructions 1628 to be executed by the processor 1602 for any application desired according to the instructions. The instructions 1628 may be stored in the system memory 1608, processor 1602, and/or instruction cache 1604 as examples of non-transitory computer-readable medium 1630. The instructions 1628 may also reside, completely or at least partially, within the system memory 1608 and/or within the processor 1602 during their execution. The instructions 1628 may further be transmitted or received over the network 1626 via the modem 1624, such that the network 1626 includes the computer-readable medium 1630.

While the computer-readable medium 1630 is shown in an exemplary embodiment to be a single medium, the term "computer-readable medium" should be taken to include a single medium or multiple media (e.g., a centralized or distributed database, and/or associated caches and servers) that store the one or more sets of instructions 1628. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
   a system ordering point circuit (SOP);
   a system memory;
   a plurality of processing elements (PEs); and
   a plurality of domains, each domain comprising:
      one or more PEs of the plurality of PEs; and
      a local ordering point circuit (LOP) communicatively coupled to the one or more PEs and to the SOP;
   wherein:
      a first LOP of a first domain of the plurality of domains is configured to:
         determine that a coherence granule, cached within a local cache of a first PE of the one or more PEs of the first domain as a first cached copy, is not cached with an Owned (O) cache coherence state within any domain of the plurality of domains; and
         update a domain coherence state indicator for the coherence granule to indicate that the coherence granule is cached in a Domain State No-Owned (DSN) domain coherence state within the first domain.

2. The processor-based device of claim 1, wherein the SOP is configured to:
- receive a request for a read access to the coherence granule from a second domain of the plurality of domains;
- determine that the coherence granule is cached in the DSN domain coherence state within the first domain; and
- read the coherence granule from the system memory to satisfy the read access.

3. The processor-based device of claim 1, wherein:
the first LOP is further configured to update the domain coherence state indicator for the coherence granule to indicate that the coherence granule is cached with a Domain State Shared (DSS) domain coherence state within the first domain;
the first LOP is configured to determine that the coherence granule is not cached with the O cache coherence state within any domain of the plurality of domains by being configured to determine that no domain of the plurality of domains caches the coherence granule with a Domain State Owned (DSO) domain coherence state; and
the first LOP is configured to update the domain coherence state indicator for the coherence granule by being configured to update the domain coherence state indicator from the DSS domain coherence state to the DSN domain coherence state.

4. The processor-based device of claim 3, wherein the first LOP is configured to determine that no domain of the plurality of domains caches the coherence granule with a DSO domain coherence state based on one or more snoop responses, observed by the first LOP, sent in response to a request for a read access to the coherence granule sent by a second PE of the plurality of PEs.

5. The processor-based device of claim 3, wherein:
the SOP is configured to:
- observe one or more snoop responses sent in response to a request for a read access to the coherence granule sent by a second PE of the plurality of PEs; and
- determine, based on the one or more snoop responses, that no domain of the plurality of domains caches the coherence granule with a DSO domain coherence state; and
- send an indication that no domain of the plurality of domains caches the coherence granule with a DSO domain coherence state to the first LOP; and the first LOP is configured to determine that no domain of the plurality of domains caches the coherence granule with a DSO domain coherence state based on the indication.

6. The processor-based device of claim 1, wherein:
the first LOP is further configured to update the domain coherence state indicator for the coherence granule to indicate that the coherence granule is cached with a DSS domain coherence state within the first domain;
the first LOP is configured to determine that the coherence granule is not cached with the O cache coherence state within any domain of the plurality of domains by being configured to determine that at least one domain of the plurality of domains caches the coherence granule with the DSN domain coherence state; and
the first LOP is configured to update the domain coherence state indicator for the coherence granule by being configured to update the domain coherence state indicator from the DSS domain coherence state to the DSN domain coherence state.

7. The processor-based device of claim 6, wherein the first LOP is configured to determine that no domain of the plurality of domains caches the coherence granule with a DSN domain coherence state based on one or more snoop responses, observed by the first LOP, sent in response to a request for a read access to the coherence granule sent by a second PE of the plurality of PEs.

8. The processor-based device of claim 6, wherein:
the SOP is configured to:
- observe one or more snoop responses sent in response to a request for a read access to the coherence granule sent by a second PE of the plurality of PEs; and
- determine, based on the one or more snoop responses, that at least one domain of the plurality of domains caches the coherence granule with the DSN domain coherence state; and
- send an indication that at least one domain of the plurality of domains caches the coherence granule with the DSN domain coherence state to the first LOP; and the first LOP is configured to determine that no domain of the plurality of domains caches the coherence granule with a DSO domain coherence state based on the indication.

9. The processor-based device of claim 1, wherein:
the first LOP is further configured to update the domain coherence state indicator for the coherence granule to indicate that the coherence granule is cached with a DSS domain coherence state within the first domain;
the first LOP is configured to determine that the coherence granule is not cached with the O cache coherence state within any domain of the plurality of domains by being configured to receive, from a third domain of the plurality of domains, a DSO_NOW_CLEAN message indicating that the coherence granule with a Domain State Owned (DSO) domain coherence state within the third domain has transitioned to the DSN domain coherence state; and
the first LOP is configured to update the domain coherence state indicator for the coherence granule by being configured to update the domain coherence state indicator from the DSS domain coherence state to the DSN domain coherence state.

10. The processor-based device of claim 1, wherein:
the first LOP is further configured to update the domain coherence state indicator for the coherence granule to indicate that the coherence granule is cached with a DSO domain coherence state within the first domain;
the first LOP is configured to determine that the coherence granule is not cached with the O cache coherence state within any domain of the plurality of domains by being configured to write the first cached copy to the coherence granule in the system memory; and
the first LOP is configured to update the domain coherence state indicator for the coherence granule by being configured to update the domain coherence state indicator from the DSO domain coherence state to the DSN domain coherence state.

11. The processor-based device of claim 10, wherein the first LOP is further configured to transmit, to other LOPs, a DSO_NOW_CLEAN message indicating that the coherence granule has transitioned to the DSN domain coherence state.

12. The processor-based device of claim 1, wherein:
the first LOP is further configured to update the domain coherence state indicator for the coherence granule to indicate that the coherence granule is cached with a Domain State Exclusive (DSE) domain coherence state within the first domain;
the first LOP is configured to determine that the coherence granule is not cached with the O cache coherence state within any domain of the plurality of domains by being configured to determine that the first PE holds an unmodified copy of the coherence granule and has provided a shared copy of the coherence granule to a third domain of the plurality of domains; and
the first LOP is configured to update the domain coherence state indicator for the coherence granule by being configured to update the domain coherence state indicator from the DSE domain coherence state to the DSN domain coherence state.

13. The processor-based device of claim 1, wherein:
the first LOP is further configured to update the domain coherence state indicator for the coherence granule to indicate that the coherence granule has a Domain State Invalid (DSI) domain coherence state within the first domain;
the first LOP is configured to determine that the coherence granule is not cached with the O cache coherence state within any domain of the plurality of domains by being configured to determine, responsive to a request for the coherence granule by the first PE, that no domain of the plurality of domains caches a modified copy of the coherence granule; and
the first LOP is configured to update the domain coherence state indicator for the coherence granule by being configured to update the domain coherence state indicator from the DSI domain coherence state to the DSN domain coherence state.

14. The processor-based device of claim 1, wherein the first LOP is further configured to:
receive, from the first PE, a request to update a cache coherence state for the first cached copy of the coherence granule from a shared (S) cache coherence state to an exclusive (E) cache coherence state; and
update the domain coherence state indicator for the coherence granule to indicate that the coherence granule is cached with a DSE domain coherence state within the first domain.

15. The processor-based device of claim 1, wherein the first LOP is further configured to:
determine that the first cached copy of the coherence granule held by the first PE is a last remaining copy of the coherence granule within the first domain;
determine that the first PE has evicted the first cached copy; and
update the domain coherence state indicator for the coherence granule to indicate that the coherence granule is cached with a DSI domain coherence state within the first domain.

16. A method, comprising:
determining, by a first local ordering point circuit (LOP) of a processor-based device, the first LOP being within a first domain of a plurality of domains each comprising one or more processing elements (PEs) of a plurality of PEs, that a coherence granule, cached within a local cache of a first PE of the one or more PEs of the first domain as a first cached copy, is not cached with an Owned (O) cache coherence state within any domain of the plurality of domains; and
updating a domain coherence state indicator for the coherence granule to indicate that the coherence granule is cached in a Domain State No-Owned (DSN) domain coherence state within the first domain.

17. The method of claim 16, further comprising:
receiving, by a system ordering point circuit (SOP) of the processor-based device, a request for a read access to the coherence granule from a second domain of the plurality of domains;
determining, by the SOP, that the coherence granule is cached in the DSN domain coherence state within the first domain; and
reading the coherence granule from a system memory to satisfy the read access.

18. The method of claim 16, wherein:
the method further comprises updating the domain coherence state indicator for the coherence granule to indicate that the coherence granule is cached with a Domain State Shared (DSS) domain coherence state within the first domain;
determining that the coherence granule is not cached with the O cache coherence state within any domain of the plurality of domains comprises determining, by the first LOP, that no domain of the plurality of domains caches the coherence granule with a Domain State Owned (DSO) domain coherence state; and
updating the domain coherence state indicator for the coherence granule comprises updating the domain coherence state indicator from the DSS domain coherence state to the DSN domain coherence state.

19. The method of claim 18, wherein determining, by the first LOP, that no domain of the plurality of domains caches the coherence granule with a DSO domain coherence state is based on one or more snoop responses, observed by the first LOP, sent in response to a request for a read access to the coherence granule sent by a second PE of the plurality of PEs.

20. The method of claim 18, further comprising:
observing, by an SOP, one or more snoop responses sent in response to a request for a read access to the coherence granule sent by a second PE of the plurality of PEs; and
determining, by the SOP based on the one or more snoop responses, that no domain of the plurality of domains caches the coherence granule with a DSO domain coherence state; and
sending, by the SOP, an indication that no domain of the plurality of domains caches the coherence granule with a DSO domain coherence state to the first LOP;
wherein determining, by the first LOP, that no domain of the plurality of domains caches the coherence granule with a DSO domain coherence state is based on the indication.

21. The method of claim 16, wherein:
the method further comprises updating the domain coherence state indicator for the coherence granule to indicate that the coherence granule is cached with a DSS domain coherence state within the first domain;
determining that the coherence granule is not cached with the O cache coherence state within any domain of the plurality of domains comprises determining, by the first LOP, that at least one domain of the plurality of domains caches the coherence granule with the DSN domain coherence state; and
updating the domain coherence state indicator for the coherence granule comprises updating the domain coherence state indicator from the DSS domain coherence state to the DSN domain coherence state.

22. The method of claim 21, wherein determining, by the first LOP, that no domain of the plurality of domains caches the coherence granule with a DSN domain coherence state is based on one or more snoop responses, observed by the first LOP, sent in response to a request for a read access to the coherence granule sent by a second PE of the plurality of PEs.

23. The method of claim 21, further comprising:
observing, by an SOP, one or more snoop responses sent in response to a request for a read access to the coherence granule sent by a second PE of the plurality of PEs; and
determining, by the SOP based on the one or more snoop responses, that at least one domain of the plurality of domains caches the coherence granule with the DSN domain coherence state; and
sending, by the SOP, an indication that at least one domain of the plurality of domains caches the coherence granule with the DSN domain coherence state to the first LOP;
wherein determining, by the first LOP, that no domain of the plurality of domains caches the coherence granule with a DSO domain coherence state is based on the indication.

24. The method of claim 16, wherein:
the method further comprises updating the domain coherence state indicator for the coherence granule to indicate that the coherence granule is cached with the DSS domain coherence state within the first domain;
determining that the coherence granule is not cached with the O cache coherence state within any domain of the plurality of domains comprises receiving, from a third domain of the plurality of domains, a DSO_NOW_CLEAN message indicating that the coherence granule with a Domain State Owned (DSO) domain coherence state within the third domain has transitioned to the DSN domain coherence state; and
updating the domain coherence state indicator for the coherence granule comprises updating the domain coherence state indicator from the DSS domain coherence state to the DSN domain coherence state.

25. The method of claim 16, wherein:
the method further comprises updating the domain coherence state indicator for the coherence granule to indicate that the coherence granule is cached with a DSO domain coherence state within the first domain;
determining that the coherence granule is not cached with the O cache coherence state within any domain of the plurality of domains comprises writing the first cached copy to the coherence granule in the system memory; and
updating the domain coherence state indicator for the coherence granule comprises updating the domain coherence state indicator from the DSO domain coherence state to the DSN domain coherence state.

26. The method of claim 25, wherein the method further comprises transmitting, to other LOPs of a plurality of LOPs, a DSO_NOW_CLEAN message indicating that the coherence granule has transitioned to the DSN domain coherence state.

27. The method of claim 16, wherein:
the method further comprises updating the domain coherence state indicator for the coherence granule to indicate that the coherence granule is cached with a Domain State Exclusive (DSE) domain coherence state within the first domain;
determining that the coherence granule is not cached with the O cache coherence state within any domain of the plurality of domains comprises determining that the first PE holds an unmodified copy of the coherence granule and has provided a shared copy of the coherence granule to a third domain of the plurality of domains; and
updating the domain coherence state indicator for the coherence granule comprises updating the domain coherence state indicator from the DSE domain coherence state to the DSN domain coherence state.

28. The method of claim 16, wherein:
the method further comprises updating the domain coherence state indicator for the coherence granule to indicate that the coherence granule has a Domain State Invalid (DSI) domain coherence state within the first domain;
determining that the coherence granule is not cached with the O cache coherence state within any domain of the plurality of domains comprises determining, responsive to a request for the coherence granule by the first PE, that no domain of the plurality of domains caches a modified copy of the coherence granule; and
updating the domain coherence state indicator for the coherence granule comprises updating the domain coherence state indicator from the DSI domain coherence state to the DSN domain coherence state.

29. The method of claim 16, wherein the method further comprises:
receiving, from the first PE, a request to update a cache coherence state for the first cached copy of the coherence granule from a shared (S) cache coherence state to an exclusive (E) cache coherence state; and
updating the domain coherence state indicator for the coherence granule to indicate that the coherence granule is cached with a DSE domain coherence state within the first domain.

30. A non-transitory computer-readable medium, having stored thereon computer-executable instructions that, when executed, cause a processor device to:
determine that a coherence granule, cached within a local cache of a first processing element (PE) of one or more PEs of a first domain of a plurality of domains as a first cached copy, is not cached with an Owned (O) cache coherence state within any domain of the plurality of domains; and
update a domain coherence state indicator for the coherence granule to indicate that the coherence granule is cached in a Domain State No-Owned (DSN) domain coherence state within the first domain.

* * * * *